US011615452B2

(12) United States Patent
Glasgow et al.

(10) Patent No.: US 11,615,452 B2
(45) Date of Patent: Mar. 28, 2023

(54) SOCIAL NETWORK-BASED INVENTORY MANAGEMENT

(71) Applicant: eBay Inc., San Jose, CA (US)

(72) Inventors: Dane Glasgow, Los Altos, CA (US); Justin VanWinkle, Greenbelt, MD (US)

(73) Assignee: EBAY INC., San Jose, CA (US)

( * ) Notice: Subject to any disclaimer, the term of this patent is extended or adjusted under 35 U.S.C. 154(b) by 19 days.

(21) Appl. No.: 17/241,235

(22) Filed: Apr. 27, 2021

(65) Prior Publication Data

US 2021/0248654 A1 Aug. 12, 2021

Related U.S. Application Data

(63) Continuation of application No. 14/826,047, filed on Aug. 13, 2015, now abandoned.

(51) Int. Cl.

*G06Q 30/00* (2012.01)
*G06Q 30/0601* (2023.01)
*G06Q 50/00* (2012.01)
*G06Q 10/087* (2023.01)

(52) U.S. Cl.

CPC ....... *G06Q 30/0613* (2013.01); *G06Q 10/087* (2013.01); *G06Q 30/0627* (2013.01); *G06Q 50/01* (2013.01)

(58) Field of Classification Search

CPC ........... G06Q 30/0613; G06Q 30/0627; G06Q 50/01; G06Q 10/087
USPC ................................................ 705/26.1–27.2
See application file for complete search history.

(56) References Cited

U.S. PATENT DOCUMENTS

| | | | |
|---|---|---|---|
| 7,330,826 | B1 | 2/2008 | Porat et al. |
| 8,583,564 | B2 | 11/2013 | Wiseman et al. |
| 8,645,203 | B2 | 2/2014 | Bocheck |
| 8,909,550 | B2 | 12/2014 | Biedermann et al. |
| 9,146,968 | B2 | 9/2015 | Lawler et al. |

(Continued)

FOREIGN PATENT DOCUMENTS

WO 2017/027206 A1 2/2017

OTHER PUBLICATIONS

Harry, David, “Google and the social graph; more data to feed the beast” Jan. 7, 2013. https://blog.searchmetrics.com/us/google-and-the-social-graph-more-data-to-feed-the-beast/ (Year: 2013).*

(Continued)

*Primary Examiner* — Anand Loharikar
(74) *Attorney, Agent, or Firm* — Schwegman Lundberg & Woessner, P.A.

(57) ABSTRACT

An example embodiment includes a system server configured for social network-based inventory management. The system server includes processors and non-transitory computer-readable storage media communicatively coupled to the processors. The media store instructions that, in response to execution by the processors, cause the processors to perform operations. The operations include receiving category specifications and access category definitions for access categories. The access category definitions include relationship criteria for the access categories. The operations include identifying a relationship between a second user and a first user, comparing an identified relationship with the relationship criteria, and determining which of the access categories the second user is included based on the comparison.

20 Claims, 14 Drawing Sheets

Second User Device 104B
User Exchange Module 106
102B
First User Device 104A
User Exchange Module 106
102A
100
Inventory 130
Product 114
Third Party Social Network Server 126
Third Party Social Network 122
Communication Network 142
Third User Device 104C
User Exchange Module 106
102C
System Server 124
Exchange Platform 118
Social Network 116
E-Commerce Server 128
Transaction Records 146

(56) References Cited

U.S. PATENT DOCUMENTS

| | | | | |
|---|---|---|---|---|
| 9,794,359 | B1 * | 10/2017 | Lessin | H04L 51/32 |
| 2006/0041517 | A1 | 2/2006 | Liao | |
| 2006/0242054 | A1 * | 10/2006 | Himmelstoin | G06Q 40/04 705/37 |
| 2008/0243628 | A1 | 10/2008 | Wiseman et al. | |
| 2013/0041916 | A1 * | 2/2013 | Biesecker | G06Q 50/01 707/769 |
| 2013/0046666 | A1 | 2/2013 | Biedermann et al. | |
| 2013/0151372 | A1 | 6/2013 | Liu | |
| 2013/0297440 | A1 | 11/2013 | Bennett et al. | |
| 2014/0188584 | A1 | 7/2014 | Park et al. | |
| 2015/0012419 | A1 | 1/2015 | Lawler et al. | |
| 2015/0199754 | A1 | 7/2015 | Greystoke et al. | |
| 2017/0046756 | A1 | 2/2017 | Glasgow et al. | |

OTHER PUBLICATIONS

First Action Interview—Pre-Interview Communication Received for U.S. Appl. No. 14/826,047, dated Nov. 1, 2017, 5 Pages.

First Office Action Interview received for U.S. Appl. No. 14/826,047, dated Feb. 9, 2018, 29 Pages.

International Preliminary Report on Patentability received for PCT Application No. PCT/US16/44128 dated Feb. 22, 2018, 11 Pages.

Advisory Action received for U.S. Appl. No. 14/826,047, dated Aug. 10, 2018, 3 pages.

Advisory Action Received for U.S. Appl. No. 14/826,047, dated Nov. 1, 2019, 3 pages.

Final Office Action received for U.S. Appl. No. 14/826,047, dated Jul. 29, 2019, 38 pages.

Final Office Action Received for U.S. Appl. No. 14/826,047, dated Jun. 12, 2020, 17 pages.

Final Office Action Received for U.S. Appl. No. 14/826,047 dated May 16, 2018, 37 pages.

First Office Action Interview received for U.S. Appl. No. 14/826,047, dated Dec. 22, 2017, 3 Pages.

Non Final Office Action Received for U.S. Appl. No. 14/826,047, dated Jan. 9, 2020, 40 Pages.

Non Final Office Action received for U.S. Appl. No. 14/826,047, dated Mar. 7, 2019, 40 Pages.

Non-Final Office Action Received for U.S. Appl. No. 14/826,047, dated Oct. 27, 2020, 19 pages.

Henry,"Google and the social graph; more data to feed the beast", Jan. 7, 2013, 15 Pages.

International Search Report received for PCT Application No. PCT/US2016/044128, dated Oct. 7, 2016, 2 pages.

Written Opinion received for PCT Application No. PCT/US2016/044128, dated Oct. 7, 2016, 9 pages.

* cited by examiner

222

| | Relationship Criteria Or Characteristics 300 | | | |
|---|---|---|---|---|
| Access Category 302 | Number Of Connections 304 | Defined Group 306 | Defined Relationship 308 | Previous Transactions 310 |
| First Access Category 302A | | | Family 308A | |
| Second Access Category 302B | < Two Connections 304A | | | |
| Third Access Category 302C | | Members Of Camera Group 306A | | |
| Fourth Access Category 302D | | | | > Two Previous Transactions 310A |
| ☒ All Inventory 312 | | ☒ Select Products 314 | | |

First Access Category 302A

| ☐ | First Product 402A | Discount/Price 404 | Terms 406 |
|---|---|---|---|
| ☑ | Buy 408 | 15% | Shipping Included |
| ☐ | Share 410 | | |
| ☑ | Rent 412 | $100 | 2 Weeks |
| ☐ | Have 416 | | |

400B

Second Access Category 302B

| ☐ | First Product 402A | Discount/Price 404 | Terms 406 |
|---|---|---|---|
| ☑ | Buy 408 | 5% | + Shipping |
| ☐ | Share 410 | | |
| ☑ | Rent 412 | $120 | 1 Weeks |
| ☐ | Have 416 | | |

400C

First Access Category 302A

| ☐ | Second Product 402B | Discount/Price 404 | Terms 406 |
|---|---|---|---|
| ☑ | Buy 408 | 20% | Shipping Included |
| ☐ | Share 410 | | |
| ☑ | Rent 412 | $500 | 1 Month |
| ☑ | Have 416 | Free | Come Get It |

400D

Second Access Category 302B

| ☐ | Second Product 402B | Discount/Price 404 | Terms 406 |
|---|---|---|---|
| ☑ | Buy 408 | 10% | + Shipping |
| ☑ | Share 410 | | Trade For Product |
| ☑ | Rent 412 | $700 | 1 Month |
| ☐ | Have 416 | | |

FIG. 4

| Relationship Table 501 | | | |
|---|---|---|---|
| **Buyer Entity** 512 | **Seller Entity** 510 | | |
| | First User 102A | Second User 102B | Third User 102C |
| First User 102A | N/A | Brother 509 | High School Friend 511 |
| Second User 102B | Brother 503 | N/A | Associate 513 |
| Third User 102C | Friend Of Friend In Social Graph (<Two Connections) 505 | Camera Friend 507 | N/A |

*FIG. 5A*

| ACD Table 500 | | | |
|---|---|---|---|
| Buyer Entity 512 | Seller Entity 510 | | |
| | First User 102A | Second User 102B | Third User 102C |
| First User 102A | N/A | First Access Category 502 | Fourth Access Category 506 |
| Second User 102B | First Access Category 302A | N/A | None 508 |
| Third User 102C | Second Access Category 302B | Third Access Category 504 | N/A |

FIG. 5B

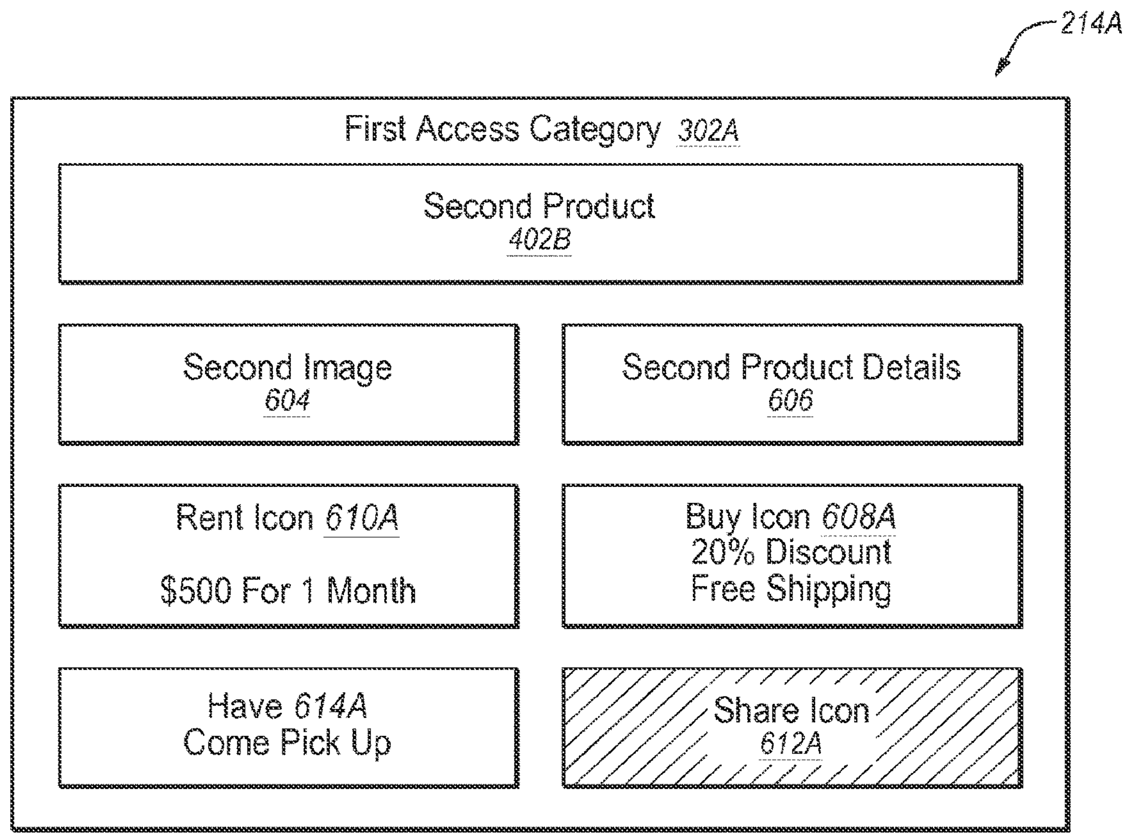
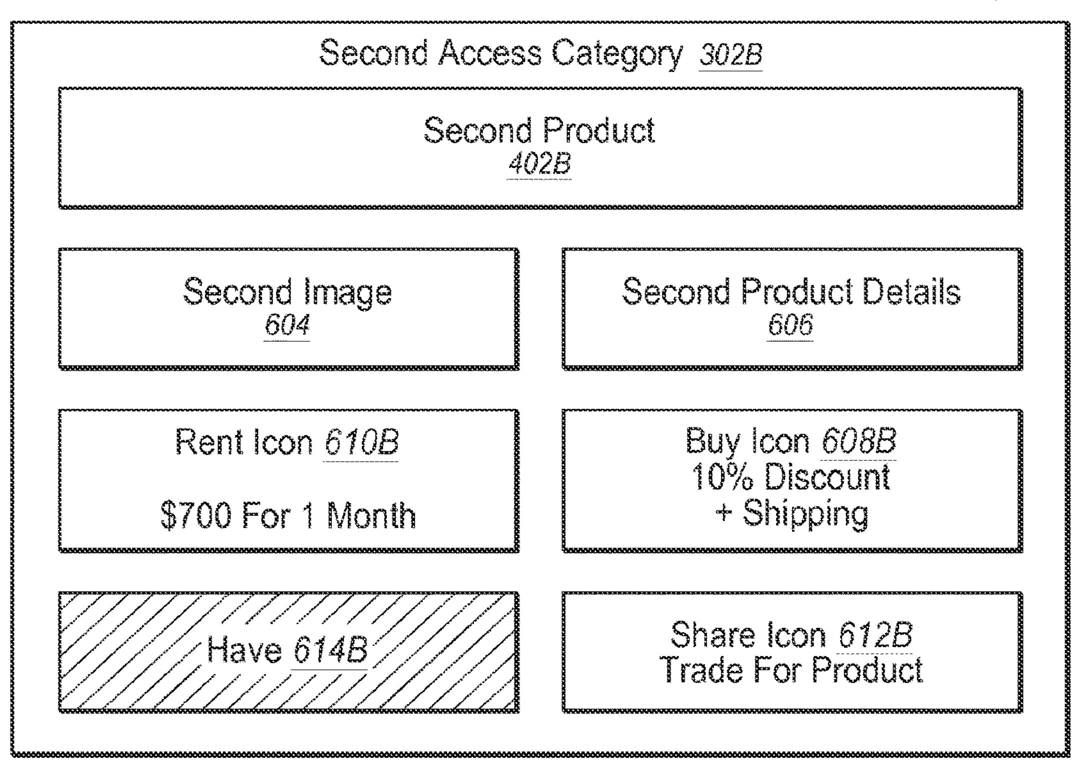
FIG. 6

SOCIAL NETWORK-BASED INVENTORY MANAGEMENT

CLAIM OF PRIORITY

This Application is a continuation of U.S. application Ser. No. 14/826,047, filed Aug. 13, 2015, which is hereby incorporated by reference in its entirety.

FIELD

The embodiments discussed herein are related to social network-based inventory management.

BACKGROUND

Individuals may offer products for sale, rent, or use online. Listings of the products may be viewable by buyers. In addition, the buyers may interact with a network platform that enables an electronic transaction for the products that are listed online.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which:

FIG. 3 illustrates an example of access category definitions that may be implemented in the operating environment of FIG. 1;

FIG. 4 illustrates example category specifications that may be implemented in the operating environment of FIG. 1;

FIG. 5A illustrates an example relationship table that may be implemented in the operating environment of FIG. 1;

FIG. 5B illustrates an example access category determination table that may be implemented in the operating environment of FIG. 1;

FIG. 6 illustrates example product listings that may be implemented in the operating environment of FIG. 1;

DESCRIPTION OF SOME EXAMPLE EMBODIMENTS

Figure 1:
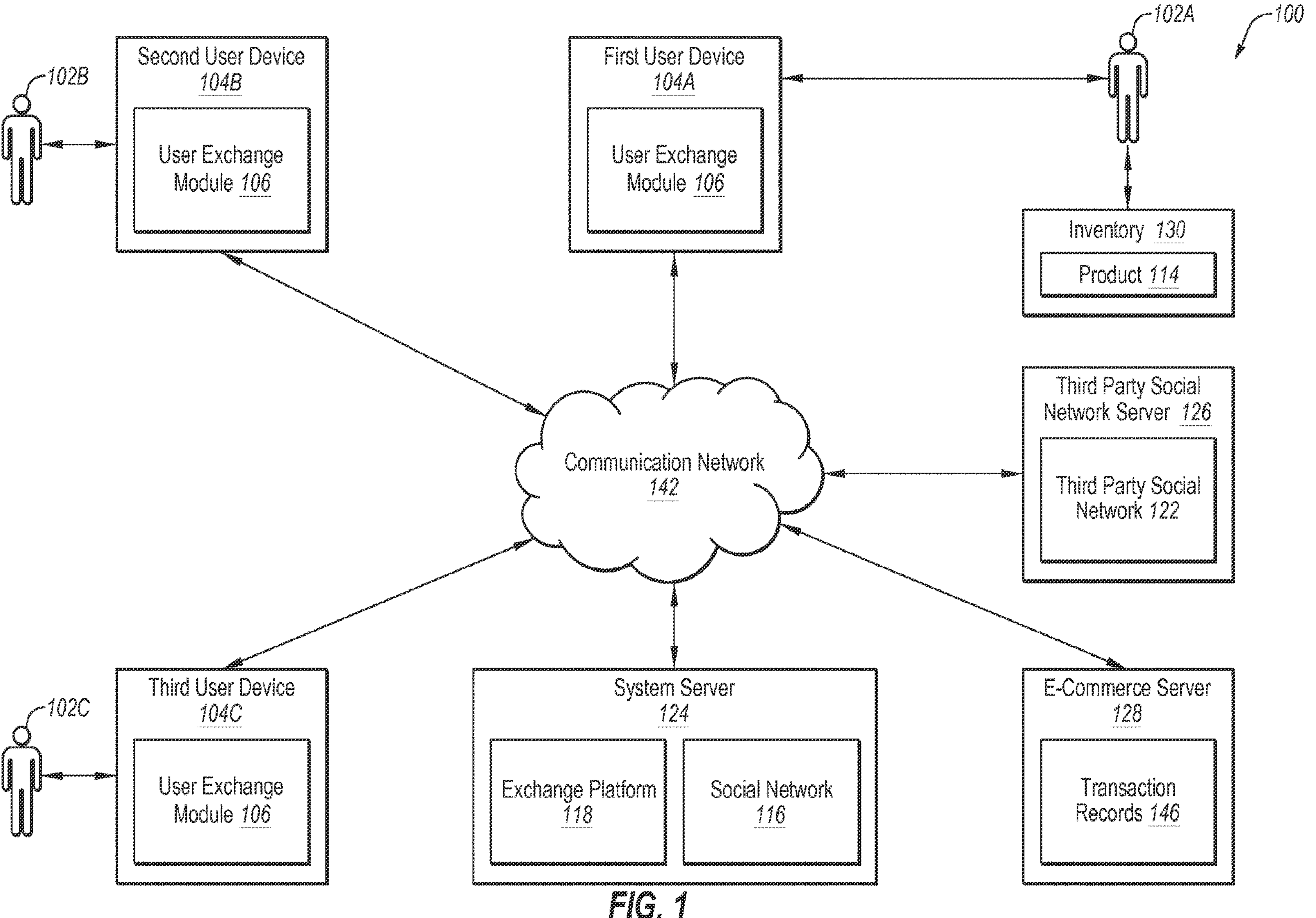
FIG. 1 illustrates an example operating environment in which social network-based inventory management may be implemented.

An individual or another entity may want to offer one or more products for sale or rent via an online medium. In addition, the individual may want to offer the products according to different transaction terms based on a relationship with a purchaser or renter. In existing systems, to offer the products with different transaction terms may involve multiple listings, which may be targeted to certain groups of purchasers or renters.

For example, selling a first product at a first price to friends, a second price to associates and a third price to strangers may involve at least three listings for the first product. Each of the three listings may be generated then sent to individuals from each group (e.g., the friends, the associates, and the strangers). Moreover, the listing may involve manually determining whether each individual qualifies as a friend, a stranger, or an associate. This process consumes resources such as the time involved in making such determinations and communicating the listings. Additionally, some classified ad services may charge per listing, which is increased due to the multiple listings.

Accordingly, some embodiments discussed herein are related to social network-based inventory management. In some embodiments, a first user, who is an owner of an inventory or authorized agent of the inventory, may define one or more access categories. One or more of the access categories include other users who meet the relationship criteria relative to the first user. Additionally, the first user may define category specifications for one or more of the access categories. The category specifications include transaction terms, transaction types, and products that are available to the users who meet the relationship criteria to be included in one of the access categories.

In these and other embodiments, a relationship between the first user and one or more other users may be identified. For example, if the relationship criteria for a first access category are three connections in one or more social graphs, then a system server may access one or more social networks and determine whether a second user is within three connections of the first user in the social graphs of accessed social networks. The determination may include parsing of login information or other user-identifying information to track connections across multiple social networks.

The identified relationships may be compared to the relationship criteria in order to determine which of the access categories the other users are included. Transactions involving products in the inventory of the first user may then be executed according to the category specifications of the access categories into which the other users are included. For example, if the second user meets the relationship criteria of the first access category, a product listing displayed to the second user or a device associated with the second user may include the category specifications of the first access category. Similarly, in circumstances in which the second user buys or rents one of the products of the inventory of the first user, the price etc. may be consistent with the category specifications of the first access category.

Some embodiments may include methods of social network-based inventory management. For example, a method of social network-based inventory management may include receiving, from a first user device, category specifications for one or more access categories. The category specifications may identify one or more of a product, a transaction term, and a transaction type that are available to users who meet relationship criteria for the access categories. The method may include identifying, by a system server, a relationship between a second user and a first user who associated with the first user device. The method may include comparing, by the system server, an identified relationship with the relationship criteria. The method may include determining, by the system server, which of the access categories of the second user is included based on a comparison between the identified relationship and the relationship criteria. The method may include receiving, from a second user device that is associated with the second user, a product request for a particular product that is offered by the first user. In response to a received product request, the method may include providing, by the system server, a product listing to the second user device for the product that includes the transaction terms and the transaction types consistent with the category specifications of the access category of the second user.

Another example may include a method of social network-based inventory management that includes receiving, from one or more user devices, relationship criteria that are defined for one or more access categories. The method may include receiving, from the user devices, category specifications that identify products, transaction terms, and transaction types that are available to users who meet the relationship criteria for the access categories. The method may include determining, by a system server, which of the access categories of one or more users are included relative to each other user based on a comparison between identified relationships between the users and the relationship criteria. The method may include receiving, from a first user device associated with a first user, input used to indicate a selection of a particular product offered by a second user. The method may include completing, at least partially by the system server, a transaction for the particular product according to the transaction terms of the access category of the first user relative to the second user.

Turning to the figures, FIG. 1 illustrates an example operating environment 100 in which social network-based inventory management may be implemented, according to at least one embodiment. In the operating environment 100, a first user 102A may list an inventory 130 on one or more websites hosted or supported by a system server 124 and/or a third party social network server 126.

A second user 102B and/or a third user 102C may be affiliated with the first user 102A by one or more connections in a social graph. The social graph may be formed and/or implemented by the system server 124 and/or the third party social network server (hereinafter, "third party server") 126. The first user 102A may then assign category specifications for a product 114 that is included in the inventory 130. The category specifications may include whether the product 114 is available, terms (e.g., price, duration, shipping, etc.) of a transaction available for the product 114, transaction types available for transfer of the product 114, or some combination thereof. The category specifications may be specified for one or more access categories, which are based on the relationships between the first user 102A and second user 102B or between the first user 102A and the third user 102C according to the social graph.

For example, the first user 102A may offer the product 114 at a 15% discount to a first access category that includes users who are one connection away from the first user 102A in the social graph. Additionally, the first user 102A may offer the product 114 at a 5% discount to a second access category that includes users who are three or fewer connections away from the first user 102A in the social graph. The second user 102B may have a relationship with the first user 102A that qualifies the second user 102B for a first access category. Accordingly, the second user 102B may access or receive the offer for the product at the 15% discount. The third user 102C may have a relationship with the first user 102A that qualifies the third user 102C for the second access category. Accordingly, the third user 102C may access or receive the offer for the product at the 5% discount.

The operating environment 100 of FIG. 1 may include the system server 124, the third party server 126, an e-commerce server 128, user devices 104A-104C (generally, user device 104 or user devices 104), and a communication network 142. The user devices 104, the system server 124, the third party server 126, and the e-commerce server 128 (collectively, environment components) may communicate information and data via the communication network 142. For example, one or more of the environment components of the operating environment 100 may communicate information and data related to management of the inventory 130, searches for the product 114, and transactions involving the product 114. Each of the environment components is briefly described in the following paragraphs.

The communication network 142 may include a wired network, a wireless network, or any combination thereof. The communication network 142 may include any suitable configuration or configurations including a star configuration, token ring configuration, or other configurations. The communication network 142 may include a local area network (LAN), a wide area network (WAN) (e.g., the Internet), and/or other interconnected data paths across which multiple devices may communicate. In some embodiments, the communication network 142 may include a peer-to-peer network. The communication network 142 may also be coupled to or include portions of a telecommunications network that may enable communication of data in a variety of different communication protocols. In some embodiments, the communication network 142 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The e-commerce server 128 may include a hardware server that includes a processor, memory, and network communication capabilities. The e-commerce server 128 may be configured for communication with one or more other environment components via the communication network 142. The e-commerce server 128 may include or host an electronic marketplace. In some embodiments, the e-commerce server 128 may include or host an electronic marketplace for individuals who are not necessarily affiliated with one another. For example, the e-commerce server 128 may include or host an online retailer (e.g., AMAZON®), an online auction site (e.g., EBAY®), a bartering site (e.g., TRADEAWAY®), a property share site (e.g., AIRBNB®), a real property leasing site (e.g., VRBO®), another electronic marketplace, or some combination thereof.

On the e-commerce server 128 or a site hosted by the e-commerce server 128, one or more individuals may participate in transactions involving the product 114. In some embodiments, the e-commerce server 128 may track the transactions and store information related to the transactions in transaction records 146. The e-commerce server 128 may host or store the transaction records 146. The information included in the transaction records 146 may include prices, conditions, and product descriptions related to transactions, and the like. The transaction records 146 may be accessible to one or more of the other environment components. In some embodiments, the system server 124 may be configured to access the transaction records 146. The system server 124 may determine a market price for the product 114 based on the transaction records 146. For example, the system server 124 may be configured to parse the information in the transaction records 146 to identify prices, transaction types, product condition, and product description to determine transaction terms (e.g., price, duration, delivery options, etc.) for a product that is similar to the product 114. The market price for the product 114 may be related to one or more of the identified prices, transaction types, etc. for a product exchanged on the e-commerce server 128 or a site hosted by the e-commerce server 128 that is similar to the product 114.

In some embodiments, the transaction records 146 may not be stored on the e-commerce server 128. In these and other embodiments, the system server 124 may be configured to access the e-commerce server 128 or a site hosted by the e-commerce server 128. The system server 124 may then parse listings for a product that is similar to the product 114. The system server 124 may determine a market price for the product 114 based on information included in the listings. The information in the listings may include prices, transaction types, product condition, and product description, for instance.

The third party server 126 may include a hardware server that includes a processor, memory, and network communication capabilities. In the illustrated implementation, the third party server 126 is configured to communicate via the communication network 142 with the other environment components.

The third party server 126 may be configured to support or host a social network or some portion of a social network. The social network may include a social structure in which one or more of the first, second, and third users 102A, 102B, and 102C (generally, user 102 or users 102) and multiple other entities may be connected by one or more common features. The common features may include relationships or other associations. For example, the relationships might include friendship, family, membership in a group while the associations might include a common workplace, a common neighborhood, a common location, a common temporary location, or a common interest. The social structure of the social network may be reflected in a social graph through which users (e.g., the users 102) are connected to one another. For instance, friends of the first user 102A may be related to the first user 102A via a connection in the social graph.

The relationships and/or the associations between users of the social network may combine to form the social graph of the social network, which may reflect a mapping of the users 102 and at least partially how they may be related.

The social network hosted or supported by the third party server 126 may include a worldwide general social network, that is publically open to enrollment and where users post updates, photos, etc. (e.g., FACEBOOK®). Additionally, the social network hosted or supported by the third party server 126 may include a closed, interest-based community social network (e.g., ELIXIO®).

The third party server 126 may be responsive to data requests such as application programming interface (API) calls. The data requests may request data related to the social graph and/or relationships between the users 102. For example, the system server 124 may be configured to access the social graph of a social network hosted by the third party server 126. User-identifying information such as login information, email address information, name, and the like may form the bases of an API call communicated to the third party server 126. A relationship between one or more of the users 102 may be determined based on information accessed from the third party server 126. For example, a first access category for the first user 102A may include users (e.g., the users 102) within three connections of the first user 102A in a social graph. The system server 124 may determine whether the second user 102B or the third user 102C are included in the first access category by accessing the social graph hosted by the third party server 126 or information therein and determining whether the first user 102A and either the second user 102B or the third user 102C are within three connections in the social graph.

In some embodiments, the operating environment 100 may include multiple third party servers 126. Two or more of the third party servers 126 may each include social graphs that are specific to a social network hosted by the third party server 126. In these and other embodiments, the system server 124 may be configured to access multiple social graphs of multiple social networks to determine relationships between the users 102. One or more of the social graphs of the multiple social networks may be queried for information related to the users 102 and compiled to determine relationships between the users 102.

For example, a first access category may include users 102 with three or fewer connections to the first user 102A. To determine whether the second user 102B may be included in the first access category, the system server 124 may access a first social graph of a first social network hosted on a first third party server 126 to find a first connection between the first user 102A and an intermediate individual. The system server 124 may access a second social graph on a second social network hosted on a second third party server 126. The system server 124 may find on the second social graph a connection between the intermediate individual and the second user 102B. Accordingly, the second user 102B may have a relationship (e.g., two connections) with the first user 102A that allows the second user 102B to be included in the first access category.

The user devices 104 may include computing devices that may include a processor, memory, and network communication capabilities. The user devices 104 may be configured for communication with one or more other environment components via the communication network 142. Some examples of the user devices 104 include a laptop computer, a desktop computer, a tablet computer, a mobile telephone, a smartphone, a personal digital assistant ("PDA"), a mobile e-mail device, a portable game player, a portable music player, smart wearable technology, or any other applicable electronic device capable of accessing the communication network 142.

In the depicted embodiment, each of the user devices 104 may be associated with one of the users 102. The users 102 are depicted in FIG. 1 as individuals. In some embodiments, one or more of the users 102 may include entities other than individuals such as corporations, government entities, and the like. An association between the user devices 104 and the users 102 may include ownership or regular operation of the user device 104 by the user 102. In some embodiments, the user devices 104 may be associated with multiple users 102 or may be a public device, which may be temporarily used by the users 102.

In some embodiments, the user devices 104 may include a user exchange module 106. The user exchange module 106 may include code and routines configured to enable access to and communication of data with an exchange platform 118 of the system server 124.

The user exchange module 106 may be implemented using hardware including a processor, a microprocessor (e.g., to perform or control performance of one or more operations), a field-programmable gate array (FPGA), or an application-specific integrated circuit (ASIC). In some other instances, the user exchange module 106 may be implemented using a combination of hardware and software. Implementation in software may include rapid activation and deactivation of one or more transistors or transistor elements such as may be included in hardware of a computing device (e.g., user devices 104 and/or servers 124, 128, 126). Additionally, software defined instructions may operate on information within transistor elements. Implementation of software instructions may at least temporarily reconfigure electronic pathways and transform computing hardware.

The user exchange module 106 may be configured to receive input from one of the users 102. The input may be used in the social network-based inventory management. For example, the user exchange module 106 may enable the user 102 to define one or more access categories. In some embodiments, defining an access category may include identifying a number of connections in one or more social graphs between users 102 that are sufficient for a user 102 to be included in the access category. In some embodiments, defining an access category may include identifying a group to which a user 102 must be a member to be included in the access category. The access categories may be defined for the product 114 or for one or more products (e.g., the product 114) included in the inventory 130.

The user exchange module 106 may also receive input from the user 102 that enables assignment of the category specifications. The category specifications may be particular to one or more of the access categories and accordingly to those users 102 who meet relationship criteria of the access categories. Some examples of the category specifications may include an identification of portions of the inventory 130 that are available, transaction terms that are available, and transaction types that are available. In addition, the user exchange module 106 may be configured to enable the second user 102B and the third user 102C to search for, browse for, and enter into transactions involving the inventory 114.

In some embodiments, the user devices 104 do not include the user exchange modules 106. In these and other embodiments, the user devices 104 may interface with the exchange platform 118 in another suitable communication pathway such as a browser interface. Additionally, the exchange platform 118 may perform one or more functionalities attributed to the user exchange module 106.

The system server 124 may include a hardware server that includes a processor, memory, and network communication capabilities. In the illustrated implementation, the system server 124 is configured to communicate via the communication network 142 with the other environment components.

The system server 124 may include the exchange platform 118. The exchange platform 118 may include code and routines for social network based inventory management. Additionally or alternatively, the exchange platform 118 may be implemented using hardware including a processor, a microprocessor (e.g., to perform or control performance of one or more operations), an FPGA, or an ASIC. In some other instances, the exchange platform 118 may be implemented using a combination of hardware and software. Implementation in software may include rapid activation and deactivation of one or more transistors or transistor elements such as may be included in hardware of a computing device (e.g., user devices 104 and/or servers 124, 128, 126). Additionally, software defined instructions may operate on information within transistor elements. Implementation of software instructions may at least temporarily reconfigure electronic pathways and transform computing hardware.

In some embodiments, the exchange platform 118 or the system server 124 may host or support a social network and/or an electronic marketplace. In embodiments in which the system server 124 hosts a social network, the social network may be similar to that described with reference to the third party server 126. For example, the social network may include a social graph, which may be used to determine relationship criteria for access categories. In some embodiments, the system server 124 may not host a social network and instead may interface with the social network hosted by the third party server 126.

The electronic marketplace may enable the users 102 to list the inventory 130, execute transactions for the inventory 130, and search the inventory 130. The listing of the inventory 130, execution of transactions for the inventory 130, and searching for the inventory 130 may be limited by and/or related to the category specifications and access categories.

For example, when the second user 102B is interested in entering a transaction for the product 114, the second user 102B may interface with the exchange platform 118. The exchange platform 118 may identify a relationship between the second user 102B and the first user 102A. For example, the exchange platform 118 may access to social graphs as described elsewhere in this disclosure. The exchange platform 118 may compare the identified relationship with the relationship criteria of the access categories. The exchange platform 118 may determine in which of the access categories the second user 102B is included based on the comparison between the identified relationship and the relationship criteria. The exchange platform 118 may receive from the second user device 104B a product request for the product 114 offered by the first user 102A.

In response to the received request, a product listing may be provided to the second user device 104B for the product 114. The product listing may include the terms and the transaction types that are consistent with the category specifications of the access category of the second user 102B. For instance, the product listing may include a price that the first user 102A has assigned to the product 114 for the access category of the second user 102B.

In addition, the exchange platform 118 may enable the users 102 to conduct searches. For instance, the first user 102A may search for users 102 who meet specific relationship criteria who are interested in the product 114. Additionally or alternatively, the second and third users 102B and 102C may search for a product. In these embodiments, the exchange platform 118 may receive a product search for the product 114. The product search may include one or more particular transaction types and/or one or more particular terms.

The exchange platform 118 may identify one or more product listings for the product 114. Based on a determined access category and the identified relationship, the exchange platform 118 may filter a subset of the product listings in which the second user 102B fails to meet relationship criteria for an access category in which the particular terms and/or the particular transaction types are available.

In the operating environment 100, memory in one or more of the environment components may be similar to memory 706 described with reference to FIG. 7, processors in one or more of the environment components may be similar to a processor 704 described with reference to FIG. 7, and network communication capabilities of one or more of the environment components may be provided by a communication unit 702 described with reference to FIG. 7.

Modifications, additions, or omissions may be made to the operating environment 100 without departing from the scope of the present disclosure. Specifically, the present disclosure may apply to operating environments that may include one or more user devices 104 associated with one or more users 102, one or more system servers 124, one or more e-commerce servers 128, one or more third party servers 126, or some combination thereof.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments the system server 124 and the e-commerce server 128 may be a single server.

Figure 2A:
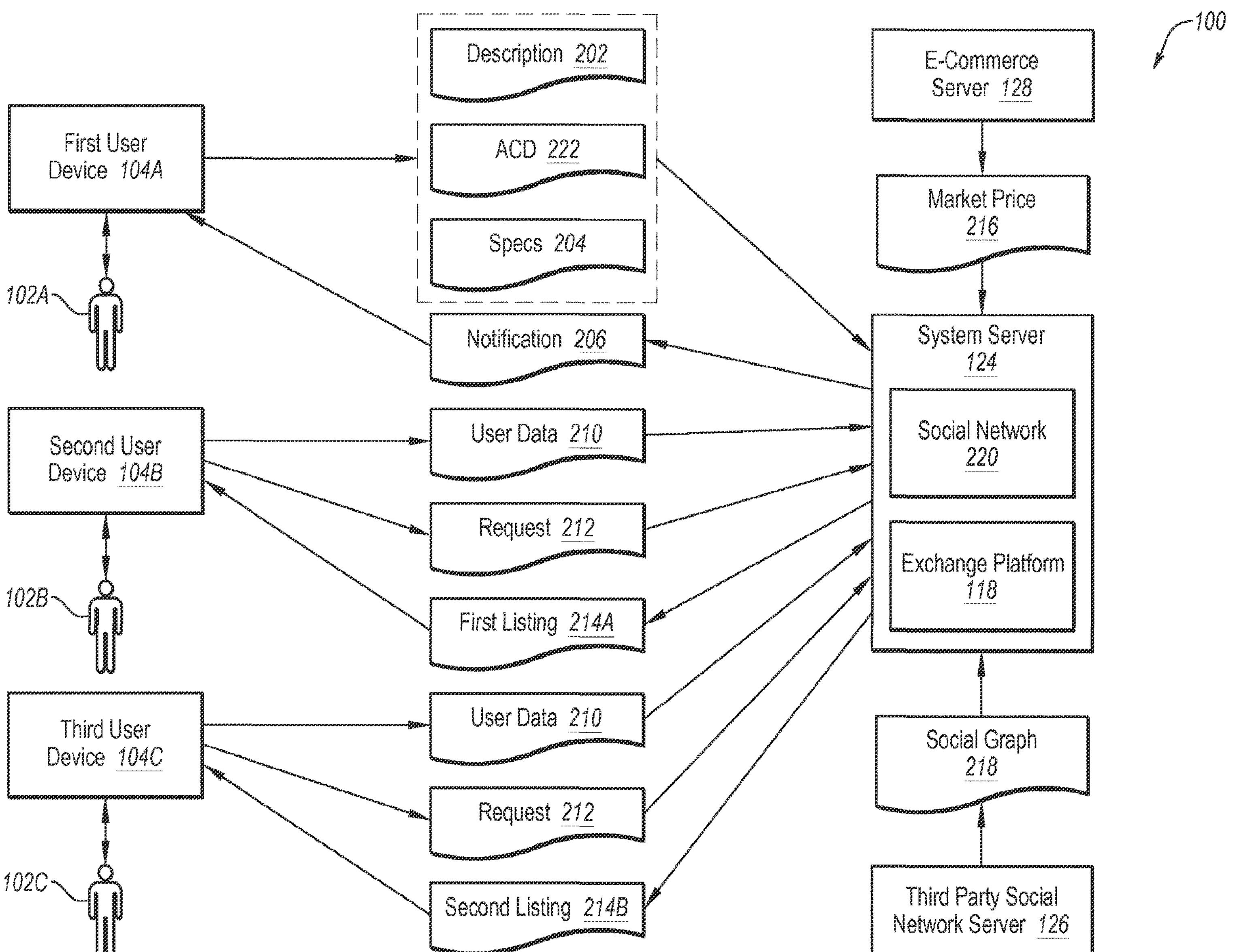
FIG. 2A illustrates an example electronic transaction that may be implemented in the operating environment of FIG. 1.

FIG. 2A illustrates an example electronic transaction that may be implemented in the operating environment 100 of FIG. 1. FIG. 2A includes the third party server 126, the e-commerce server 128, the users 102, and the system server 124 described with reference to FIG. 1. While the communication network 142 is omitted from FIG. 2A, it may be understood with the benefit of this disclosure that communication between the third party server 126, the e-commerce server 128, the users 102, and the system server 124 may be via the communication network 142 of FIG. 1.

In FIG. 2A, the first user device 104A may communicate to the system server 124 a description 202 of products or a product included in an inventory. The description 202 may include one or more images and/or an explanation of the products included in an inventory. The exchange platform 118 may receive the descriptions 202. The descriptions 202 may be stored on the memory of the system server 124 or in a remote memory. The descriptions 202 may be organized such that the descriptions are associated with a corresponding product. In addition, the exchange platform 118 may perform a search of the third party server 126 based at least partially on some portion of the description 202.

For example, with reference to FIGS. 1 and 2A, the description 202 may be of the product 114 of the inventory 130. The description 202 may include images and product details such as a type, condition, etc. of the product 114. The exchange platform 118 may associate the description 202 with the product 114. Accordingly, if the second user 102B is provided a product listing of the product 114, the product listing may include the image and/or the product details included in the description 202. In addition, to ascertain a market price 216, the exchange platform 118 may use the type, condition, etc. of the description 202. For instance, the exchange platform 118 may access via API calls or another applicable data surveying or requesting operation.

Referring back to FIG. 2A, the first user device 104A may communicate access category definitions 222 (in FIG. 2A, "ACD 222"). The access category definitions 222 may include relationship criteria that a user 102 must meet to be included in one or more access categories. The relationship criteria may include a specific number of connections in a social graph, a temporary location, a permanent location, membership in a group, inclusion in a particular social network, a particular individual, a particular relationship status, or some combination thereof. Additionally or alternatively, in some embodiments, the access category definitions 222 may be based on one or more other characteristics of an individual that may be accessed or ascertained by the exchange platform 118. For example, inclusion in an access category may be based on a transaction history with an individual, an age, one or more demographic criteria, a demographic status, or a recent event.

An example of an access category based on relationship criteria and another characteristic may include offering baby clothes to any user within one connection in a social graph or any individual who recently updated a status in a social network as recently having a child and needing baby clothes.

With reference to FIG. 3, an example of access category definitions 222 is illustrated that may be implemented in the operating environment 100 of FIG. 1. The access category definitions 222 of FIG. 3 are depicted in a simple table form. In some embodiments, the access category definitions 222 may be input using an interface between the exchange platform 118 and the first user device 104A of FIG. 1, for instance.

In the access category definitions 222, four access categories 302A-302D (generally, access category 302 or access categories 302) may be defined according to one or more relationship criteria or characteristics 300. In the access category definitions 222, relationship criteria or characteristics 300 include a number of connections 304, a defined group 306, a defined relationship 308, previous transactions 310, or some combination thereof. In other embodiments, the access categories 302 may be based on other criteria or characteristics as described elsewhere in this disclosure.

In the embodiment of FIG. 3, the relationship criteria or characteristics 300 of a first access category 302A is defined as family 308A. Thus, for a user 102 to be included in the first access category 302A, the user 102 must be included in a family of the user 102 who defined the access categories 302. In some embodiments, the defined relationship 308 may include other defined relationships such as friend, close friend, mentor, mentee, employee, employer, spouse, child, grandchild, etc.

The relationship criteria or characteristics 300 of a second access category 302B is fewer than two connections in a social graph 304A (in FIG. 3, "<two connections 304A"). Thus, for a user 102 to be included in the second access category 302B, the user 102 must be within two or fewer connections from the user 102 who defined the access categories 302. In some embodiments, the number of connections 304 may be one or more connections. Additionally or alternatively, the number of connections 304 may be defined specific to one or more social networks. For example, a user 102 who defined the access categories 302 may define one of the access categories 302 to include two or fewer connections in a first social network and at least one connection in a second social network.

The relationship criteria or characteristics 300 of a third access category 302C are membership of camera group 306A (in FIG. 3, "members of camera group 306A"). Thus, to be included in the third access category 302C, a user 102 must be a member of a camera group specified by the user 102 who defined the access categories 302. In some embodiments, the defined group 306 may include any group defined explicitly or implicitly in a social network.

The relationship criteria or characteristics 300 of a fourth access category 302D is greater than two previous transactions 310A (in FIG. 3, ">two previous transactions 310A").

Thus, to be included in the fourth access category 302D, a user 102 must have been involved in greater than two transactions with the user 102 who defined the access categories 302. In some embodiments, any number or type of transactions may be specified. For instance, one of the access categories 302 may be set as a criteria of at least one rental transaction in which all terms were complied with and the like.

In addition, in the access category definitions 222 of FIG. 3 there is an option for the access categories 302 applicability to all inventory 312 or select products 314. In the depicted embodiment, the all inventory 312 option is selected. Accordingly, the access categories 302 may be applied to an entire inventory. If the select products 314 option is selected, then the access categories may be applied to one or more products, which may be selected by a user 102. Accordingly, in these and other embodiments, the access categories 302 may be particular to one or more products.

In some embodiments, one or more of the access categories 302 may be defined by a default system or operation. For example, the first access category 302A may be defined by a default system and the first user 102A may define the relationship criteria second, third, and fourth access categories 302B-302D.

Referring back to FIG. 2A, the first user device 104A may communicate category specifications 204 (in FIG. 2A, "spec 204"). The exchange platform 118 may store the category specifications 204. In some embodiments, the category specifications 204 may include a discount based on a market price 216. For example, for a first access category, a product may be offered for a 15% discount from the market price 216. For a second access category, the product may be offered for a 5% discount from the market price 216. The market price 216 may be accessed and/or ascertained from the e-commerce server 128 or information available on the e-commerce server 128.

With reference to FIG. 4, example category specifications 400A-400D (generally, category specification 400 or category specifications 400) are illustrated that may be implemented in the operating environment 100 of FIG. 1. The category specifications 400 include one or more transaction types 408, 410, 412, and 416; transaction terms 406; and a discount/price 404. The transaction types 408, 410, 412, and 416, the transaction terms 406; and the discount/price 404 are included for a first product 402A and a second product 402B and for a first access category 302A and a second access category 302B. The category specifications 400 of FIG. 4 are depicted in a simple table form. In some embodiments, the category specifications 400 may be input using a user interface between the exchange platform 118 and the first user device 104A of FIG. 1, for instance.

In the category specifications 400, a user may select one or more transaction types. In the depicted embodiment, the transaction types include a buy transaction 408 (in FIG. 4, "buy 408"), a share transaction 410 (in FIG. 4, "share 410"), a rent transaction 412 (in FIG. 4, "rent 412"), and a have transaction 416 (in FIG. 4, "have 416"). In other embodiments, other transaction types may be included such as a trade transaction, an auction transaction, a barter transaction, any other type of transaction involving one or more products of an inventory.

A user may select among the transaction types 408, 410, 412, and 416 for each of the products 402 and/or for each of the access categories 302. In addition, the user may specify the discount/price 404 and/or the terms 406 for one or more of the selected transaction types 408, 410, 412, and 416.

For example, in FIG. 4, a first category specification 400A is for the first product 402A and for the first access category 302A. In the depicted first category specification 400A, selected transaction types include the buy transaction 408 and the rent transaction 412. For the buy transaction 408, the discount/price 404 includes a 15% discount from a market price and the terms 406 include "shipping included." For the rent transaction 412, the discount/price 404 is $100 and the terms 406 is "2 weeks." Accordingly, a user that meets relationship criteria of the first access category 302A may be able to buy the first product 402A at the 15% discount with shipping included or rent the first product 402A for $100 for two weeks.

A second category specification 400B is for the first product 402A and for the second access category 302B. In the depicted second category specification 400B, selected transaction types include the buy transaction 408 and the rent transaction 412. For the buy transaction 408, the discount/price 404 includes a 5% discount from a market price and the terms 406 include "+ shipping." For the rent transaction 412, the discount/price 404 is $120 and the terms 406 include "1 week." Accordingly, a user that meets relationship criteria of the second access category 302B may be able to buy the first product 402A at the 5% discount and shipping is not included or rent the first product 402A for $120 for one week.

A third category specification 400C is for the second product 402B and for the first access category 302A. In the depicted third category specification 400B, selected transaction types include the buy transaction 408, the rent transaction 412, and the have transaction 416. For the buy transaction 408, the discount/price 404 includes a 20% discount from a market price and the terms 406 include "shipping included." For the rent transaction 412, the discount/price 404 is $500 and the terms 406 include "1 month." For the have transaction 410 the discount/price 404 is "free" and the terms include "come get it." Accordingly, a user that meets relationship criteria of the first access category 302A may be able to buy the second product 402B at the 20% discount and shipping is included, may rent the second product 402B for $500 for one month, or have the second product 402B if the user comes to get it.

A fourth category specification 400D is for the second product 402B and for the second access category 302B. In the depicted fourth category specification 400D, selected transaction types include the buy transaction 408, the share transaction 410, and the rent transaction 412. For the buy transaction 408, the discount/price 404 includes a 10% discount from a market price and the terms 406 include "+ shipping." For the share transaction 410 there is not a discount/price 404 and the terms include "trade for product." For the rent transaction 412, the discount/price 404 is $700 and the terms 406 include "month." Accordingly, a user that meets relationship criteria of the second access category 302B may be able to buy the second product 402B at the 10% discount and shipping is not included, may share the second product 402B for a product, or rent the second product 402B for $700 for one month.

A comparison between the first category specification 400A and the second category specification 400B illustrates that the selected transaction types may be the same between the first and second access categories 302A and 302B. The discount/price 404 and/or the terms 406 may differ between the first and second access categories 302A and 302B. A comparison between the first category specification 400A and the third category specification 400C illustrates that the selected transaction types may differ between goods in the same access category (e.g., the first access category 302A). A comparison between the third category specification 400C and the fourth category specification 400D illustrates that the selected transaction types may differ between the first access category 302A and the second access category 302B. Additionally, the discount/price 404 and/or the terms 406 may differ between the first and second access categories 302A and 302B for the same product.

Referring back to FIG. 2A, the second user device 104B and the third user device 104C may communicate user data 210 to the system server 124. The user data 210 may include login information, a network address, other identifying data, or some combination thereof. For example, the user data 210 may be communicated to the system server 124 when the second user 102B or the third user 102C log into the exchange platform 118.

Based on the user data 210, the system server 124 may identify a relationship between the second user 102B or the third user 102C and the first user 102A. For example, the exchange platform 118 may be configured to analyze the social network 220 hosted on the system server 124 to identify the relationship between the users 102. Additionally or alternatively, the system server 124 may access a social graph 218 from the third party server 126. Based on the social graph 218 and/or analysis of the social network 220, the relationships between the users 102 may be identified.

The identified relationships may be compared with the relationship criteria included in the category specification 204. In addition, based on the comparison between the identified relationship and the relationship criteria, the system server 124 may determine in which of the access categories the users are included.

With reference to FIGS. 5A and 5B, an example relationship table 501 and an example access category determination table (ACD table) 500 are depicted that may be implemented in the operating environment 100 of FIG. 1. The relationship table 501 depicts an example set of identified relationships between seller entities 510, which are depicted in the columns, and buyer entities 512, which are depicted in the rows.

In the relationship table 501, the identified relationships (e.g., 503, 505, 509, 507, 511, and 513) may indicate a relationship of the buyer entity 512 with respect to the seller entity 510. For example, the exchange platform 118 of FIGS. 1-2B may identify relationships between the buyer entities 512 and the seller entities 510 based on one or more of a temporary location, a permanent location, a group membership, a number of connections in one or more social graphs of one or more social networks, other characteristics of users, or some combination thereof as described elsewhere herein.

In some instances, the identified relationships may be symmetric. For example, the second user 102B may have the identified relationship of "brother 503" with respect to the first user 102A. Likewise, the second user 102B may have the identified relationship of "brother 509" with respect to the first user 102. The identified relationships may be symmetric based on the nature of the relationship, e.g., siblings, spouses, co-workers, etc. In addition, symmetry may be based on selections by the seller entities 510.

In other instances, the identified relationships may be asymmetric. For example, the third user 102C may have the identified relationship of "camera friend 507" with respect to the second user 102B. However, the second user 102B may have the identified relationship of "associate 513" with respect to the third user 102C. The asymmetry may result from the relationship criteria generated by the individual users 102, which may differ. The identified relationships may be product-specific, may be for a set of products, or may be for all of an inventory. Moreover, the identified relationships may change temporally. For example, as friends drift apart the number of connections in a social graph may increase, which may change an identified relationship.

In some embodiments, the exchange platform 118 the identified relationships may be identified from a perspective of the seller entity 510. For example, for a particular transaction, the identified relationship is based on how the seller entity 510 has deemed or defined her relationship with the buyer entity 512. The way in which the buyer entity 512 had defined her relationship with the seller entity 510, whether symmetric or asymmetric, may not be considered.

The ACD table 500 depicts a set of access category determinations made for seller entities 510. The access category determinations may be based on identified relationships such as the identified relationships of in the relationship table 501. In the ACD table 500, the columns indicate which of the users 102, with respect to which the determinations are made. For instance, with respect to the first user 102A, the relationship criteria of the first access category 302A may include "family member." Because the identified relationship of the second user 102B with respect to the first user 102A is brother 503 (from FIG. 5A) meets the relationship criteria of the first access category 302A, the second user 102B may be included in the first access category 302A of the first user 102A. Similarly, the relationship criteria of the second access category 302B may include fewer than two connections in a social graph. Because the third user 102C may meet the relationship criteria of the second access category 302B (e.g., the third user 102C is a friend of a friend in a social graph 505 from FIG. 5A), the third user 102C may be included in the second access category of the first user 102A.

Likewise, with respect to the second user 102B, the first user 102A may meet the relationship criteria of a first access category 502 as defined by the second user 102B and the third user 102C may meet the relationship criteria of a third access category 504 as defined by the second user 102B. The first user 102A may meet the relationship criteria of a fourth access category 506 as defined by the third user 102C. However, the second user 102B may not meet the relationship criteria of any access categories defined by the third user 102C.

In some embodiments, the ACD table 500 and/or the relationship table 501 may be for a single product; for multiple products, which may be selected by the seller entity 510, or an entire inventory depending on how the access categories are defined. In embodiments in which the ACD table 500 and/or the relationship table 501 is for less than an entire inventory, there may be multiple columns for one or more of the first user 102A, the second user 102B, and the third user 102C.

Referring back to FIG. 2A, the second user device 104B and the first user device 104C may communicate product requests 212 (in FIG. 2A, "request 212"). The product requests 212 may include input used to select or otherwise indicate interest in a particular product that is offered by the first user 102A. In response to the request 212 the system server 124 provides a first product listing 214A or a second product listing 214B to the second user device 104B and the third user device 104C, respectively. The first and second product listings 214A and 214B are for the particular product, and may be modified to be consistent with the category specifications 204 of the access categories of each of the users 102B and 102C.

For example, with combined reference to FIGS. 2A and 6, examples of the product listings 214A and 214B are illustrated. In the example of FIG. 6, the product requests may be for the second product 402B. Furthermore, in the example, the second user 102B may meet the relationship criteria of the first access category 302A. Accordingly, a first product listing 214A may include transaction terms, transaction types, etc. included in the category specifications 204 for the first access category 302A. Additionally, the third user 102C may meet the relationship criteria of the second access category 302B. Accordingly, a second product listing 214B may include transaction terms, transaction types, etc. included in the category specifications 204 for the second access category 302B.

For the first access category 302A, a have transaction type, a rent transaction type, and a buy transaction type may be available and a share transaction type may not be available. Conversely in the second access category 302B, the have transaction type may not be available and the buy transaction type, the rent transaction type, the share transaction type may be available. Thus, the first product listing 214A includes a first rent icon 610A, a first buy icon 608A, and a first have icon 614A. In the first product listing 214A, a first share icon 612A may not be available, which indicates the transaction type in not available and is represented in FIG. 6 by diagonal hashing of the first share icon 612A. Similarly, in the second product listing 214B the second product listing 214A includes a second rent icon 610B, a second buy icon 608B, and a second share icon 612B. In the second product listing 214B, a second have icon 614B may not be available, which indicates the transaction type in not available and is represented in FIG. 6 by diagonal hashing of the second have icon 614B.

In addition, one or more of the icons (e.g., 608A, 608B, 610A, 610B, 614A, and 612B) may include price/discount and/or terms as specified in category specifications. For instance, the first product listing 214A includes the first rent icon 610A. The first rent icon 610A includes text "$500 FOR 1 MONTH" which may be the price/discount and the terms for the first access category 302A.

FIG. 6 includes two product listings 214A and 214B. In some embodiments, one or more product listing may be generated for the particular product. One or more of the product listings may be specific to a user and the relationship criteria met by such user. For instance, the product listing includes transaction terms, transaction types, etc. included in the category specifications 204 for the access category and for the particular product. If the multiple users meet the relationship criteria of the same access category, more than one listing may be substantially identical.

Referring back to FIG. 2A, the second user device 104B and/or the third user device 104C may communicate input to the system server 124 that is used to indicate that a user associated with the second user device 104B and/or the third user device 104C selects the particular product. The input may further indicate that user wants to execute a transaction involving the particular product. The system server 124 may then communicate a notification 206 to the first user device 104A. The notification 206 notifies a first user associated with the first user device 104A of the received input from the second user device 104B and/or the third user device 104C. The system server 124 may then complete a transaction for the product according to the terms of the access category.

Figure 2B:
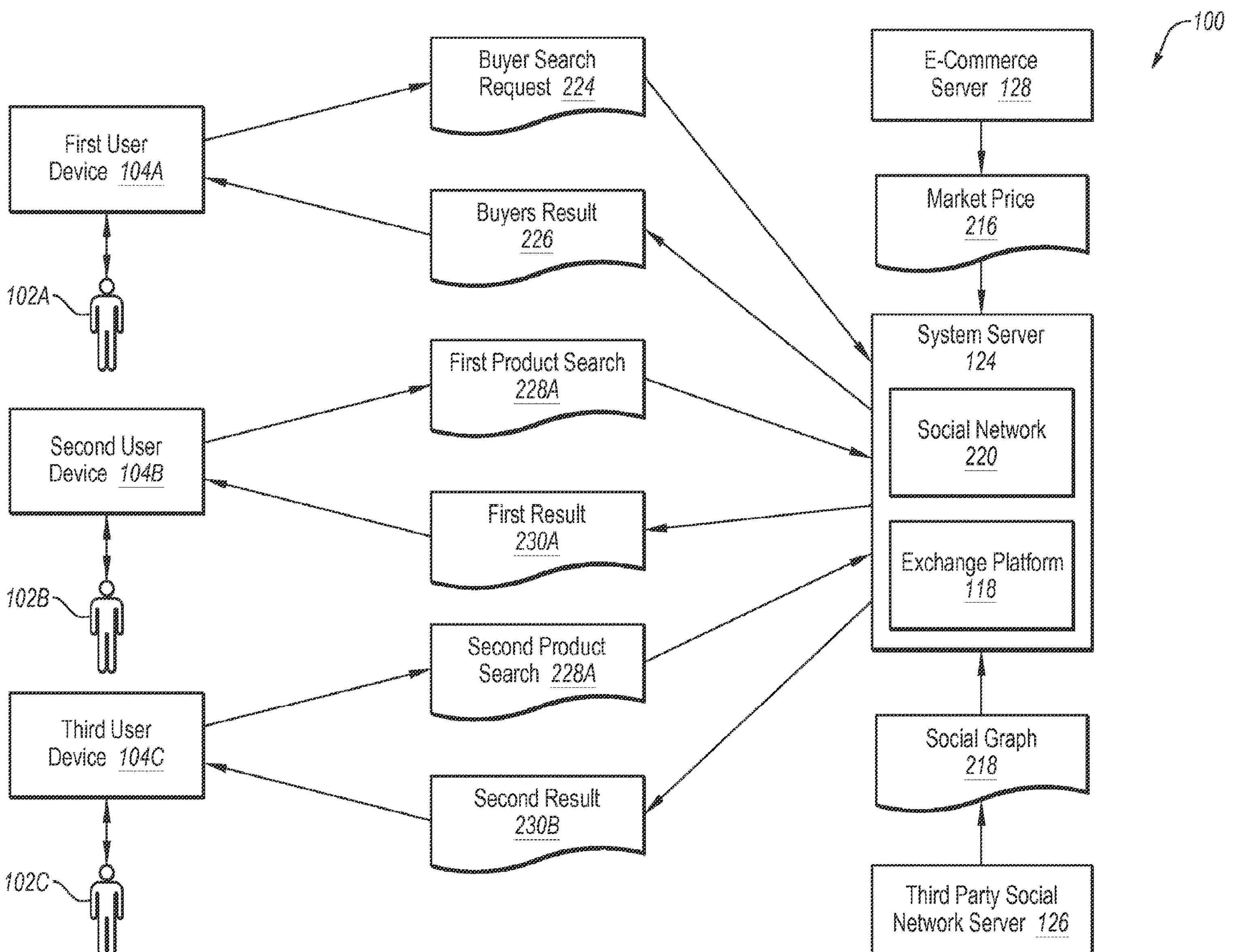
FIG. 2B illustrates example electronic searches that may be performed in the operating environment of FIG. 1.

FIG. 2B illustrates example electronic searches that may be performed in the operating environment 100 of FIG. 1. FIG. 2B includes the third party server 126, the e-commerce server 128, the users 104, and the system server 124 described with reference to FIG. 1. While the communication network 142 is omitted from FIG. 2B, it may be understood with the benefit of this disclosure that communication between the third party server 126, the e-commerce server 128, the users 104, and the system server 124 may be via the communication network 142 of FIG. 1.

Generally, the first user 102A, who is listing a product, may perform a buyer search. The buyer search may result in one or more users 102 who fit particular buyer search criteria. The buyer search criteria may include the relationship criteria for a particular access category, one or more category specifications (e.g., transaction types and/or transaction terms), one or more other characteristic of the user 102, or some combination thereof. In addition, the buyer search criteria may include products that have been previously searched for and/or purchased by one or more of the users 102.

Additionally or alternatively, in the environment 100, one or more of the second user 102B and the third user 102C may perform a product search. The product search may return results that reflect the category specifications of the access categories of the second user 102B and the third user 102C.

In the embodiment of FIG. 2B, to conduct a buyer search, the first user 102A may communicate to the system server 124 a buyer search request 224. The buyer search request 224 may include one or more buyer search criteria and/or an offered product. For example, the first user 102A may conduct a search for users 102 who meet particular relationship criteria and have purchased a particular good recently. The system server 124 may receive the buyer search request 224 and conduct a search of the users 102 who meet the buyer search criteria. The system server 124 may provide buyers results 226 to the first device 104A. The buyer results 226 may include an identification of one or more users 102 who meet relationship criteria relative to the first user 102A such that the buyer search criteria are available.

For example, to find one or more users 102 who meet the particular relationship criteria, the system server 124 may identify a relationship between the second user 102B and the first user 102A as well as a relationship between the third user 102C and the first user 102A. The system server 124 may then determine which access categories the second and third users 102B and 102C are included relative to the first user 102A. The determination may be based on a comparison between identified relationships and relationship criteria defined by the first user 102A. If one or both of the second user 102B and 102C meet relationship criteria of an access category such that the buyer search criteria are available, then the users 102B and/or 102C may be included in the buyers result 226.

Additionally, in the embodiment depicted in FIG. 2B, the system server 124 performs product searches. In some embodiments, the system server 124 may receive one or more product searches 228A and 228B (generally, product searches 228 or product search 228). The product searches 228 may include an identification of a sought product, one or more particular transaction types, one or more particular terms, or some combination thereof. The system server 124 may identify relationships between the users 102 and determine which of access categories the users 102 are included relative to one or more other users 102. The determination may be based on a comparison between the identified relationships and relationship criteria defined by the users 102.

The system server 124 may identify one or more product listings for the sought product. The system server 124 may then filter a subset of the product listings in which the user 102 who communicated the product search 228 fails to meet relationship criteria for an access category in which the particular terms and/or the particular transaction types are available. The system server 124 may then communicate to a device 104 associated with the user 102 who communicated the product search 228 a search result 230A or 230B (generally, search results 230 or search result). The search results 230 may include one or more product listings for the sought product, that include the particular transaction terms and the particular transaction types of the product search 228. The system server 124 may also communicate to one or more other user devices 104, the product search 228 and an identification of the user 102 who communicated the product search 228.

For example, the second user 102B and the third user 102C may communicate a first product search 228A and a second product search 228B, respectively to the system server 124. The product searches may identify a product offered by the first user 102A. The system server 124 may identify relationships between the first user 102A and the second user 102B and between the first user 102A and the third user 102C and determine access categories of the second user 102B and the third user 102C relative to the first user 102A.

The system server 124 may then identify product listings for the product offered by the first user 102A and filter the product listings that do not include the transaction terms, transaction types, etc. that are not available to the second user 102B or the third user 102C because of the access category in which they are included. The system server 124 may then communicate to the second user device 104B a first result 230A. The first result 230A includes the product listings having the transaction terms, transaction types, etc. of the first product search 228A. Similarly, the system server 124 may then communicate to the third user device 104C a second result 230B. The second result 230B includes the product listings having the transaction terms, transaction types, etc. of the second product search 228B.

In some embodiments, the system server 124 may then communicate to the first user device 104A, one or both of the product searches 228 and/or an identification of the users 102 who communicated the product searches 228.

Figure 7:
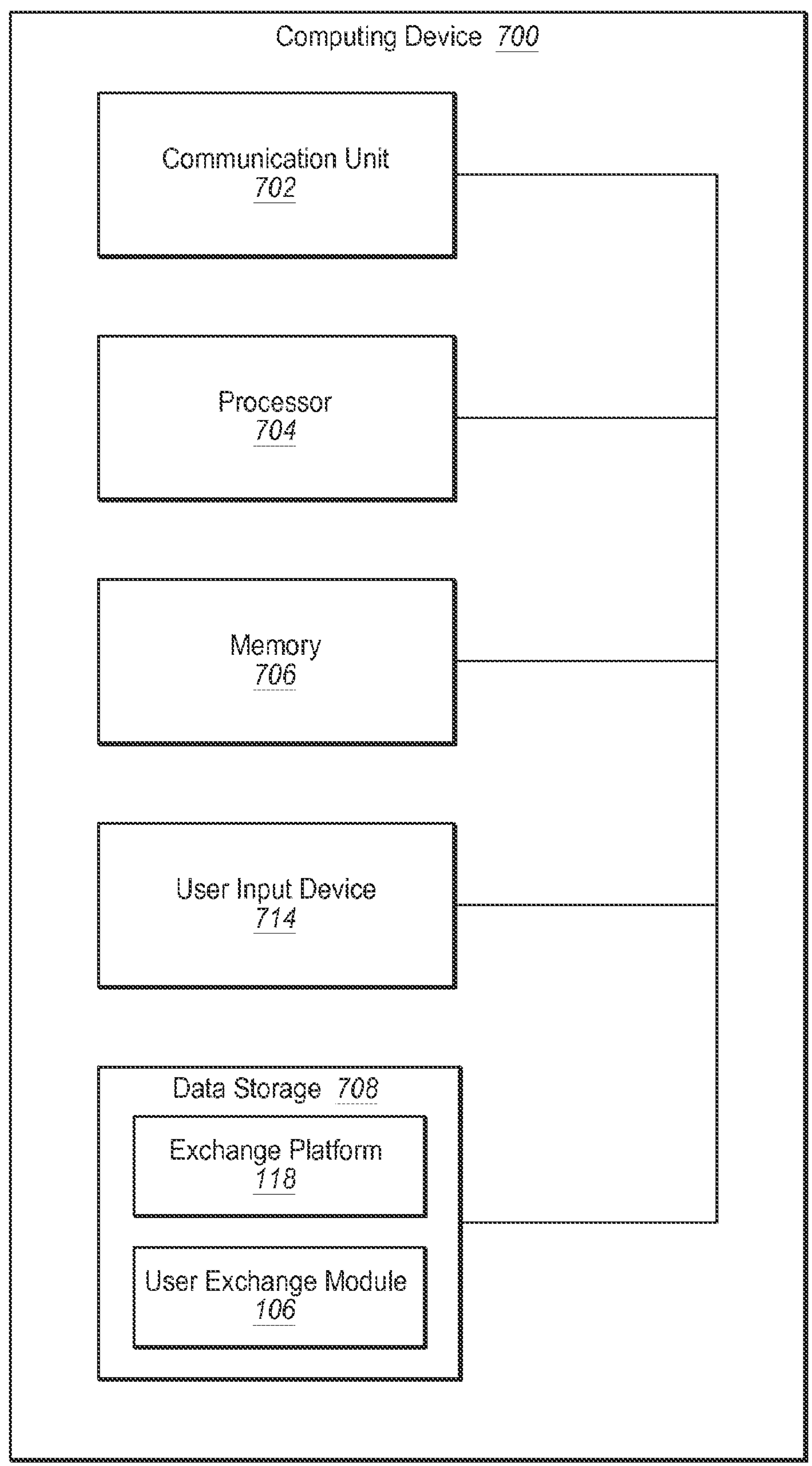
FIG. 7 illustrates an example computing device configured for social network-based inventory management.

FIG. 7 illustrates an example computing device 700 configured for social network-based inventory management that may be implemented in the operating environment 100. The computing device 700 may be configured for social network-based inventory management. Examples of the computing device 700 may include one or more of the user devices 104, the system server 124, the e-commerce server 128, and the third party server 126.

The computing device 700 may include one or more processors 704, a memory 706, a data storage 708 that includes the exchange platform 118 and the user exchange module 106, a communication unit 702, and a user input device 714.

The processor 704 may include any suitable special-purpose or general-purpose computer, computing entity, or processing device including various computer hardware or software modules and may be configured to execute instructions stored on any applicable computer-readable storage media. For example, the processor 704 may include a microprocessor, a microcontroller, a digital signal processor (DSP), an ASIC, a FPGA, or any other digital or analog circuitry configured to interpret and/or to execute program instructions and/or to process data.

Although illustrated as a single processor in FIG. 7, the processor 704 may more generally include any number of processors configured to perform individually or collectively any number of operations described in the present disclosure. Additionally, one or more of the processors 704 may be present on one or more different electronic devices or computing systems. In some embodiments, the processor 704 may interpret and/or execute program instructions and/or process data stored in the memory 706, the data storage 708, or the memory 706 and the data storage 708. In some embodiments, the processor 704 may fetch program instructions from the data storage 708 and load the program instructions in the memory 706. After the program instructions are loaded into the memory 706, the processor 704 may execute the program instructions.

The memory 706 and data storage 708 may include computer-readable storage media for carrying or having computer-executable instructions or data structures stored thereon. Such computer-readable storage media may include any available media that may be accessed by a general-purpose or special-purpose computer, such as the processor 704. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 704 to perform a certain operation or group of operations.

The communication unit 702 may include one or more pieces of hardware configured to receive and send communications. In some embodiments, the communication unit 702 may include one or more of an antenna, a wired port, and modulation/demodulation hardware, among other communication hardware devices. In particular, the communication unit 702 may be configured to receive a communication from outside the computing device 700 and to present the communication to the processor 704 or to send a communication from the processor 704 to another device or network.

The user input device 714 may include one or more pieces of hardware configured to receive input from and/or provide output to a user. In some embodiments, the user input device 714 may include one or more of a speaker, a microphone, a display, a keyboard, and a touch screen, a holographic projection, among other hardware devices. In these and other embodiments, the user input device 714 may be configured to receive input from a user (e.g., one of the parties 120) of the computing device 700.

The exchange platform 118 and/or the user exchange module 106 may include program instructions stored in the data storage 708. The processor 704 may be configured to load the exchange platform 118 and/or the user exchange module 106 into the memory 706 and execute the exchange platform 118 and/or the user exchange module 106. Alternatively, the processor 704 may execute the exchange platform 118 and/or the user exchange module 106 line-by-line from the data storage 708 without loading them into the memory 706. When executing the exchange platform 118 and/or the user exchange module 106, the processor 704 may be configured to for social network-based inventory management as described elsewhere herein.

Modifications, additions, or omissions may be made to the computing device 700 without departing from the scope of the present disclosure. For example, in some embodiments, the computing device 700 may not include the user input device 714. In some embodiments, the different components of the computing device 700 may be physically separate and may be communicatively coupled via any suitable mechanism. For example, the data storage 708 may be part of a storage device that is separate from a server, which includes the processor 704, the memory 706, and the communication unit 702, that is communicatively coupled to the storage device.

Figure 8A:
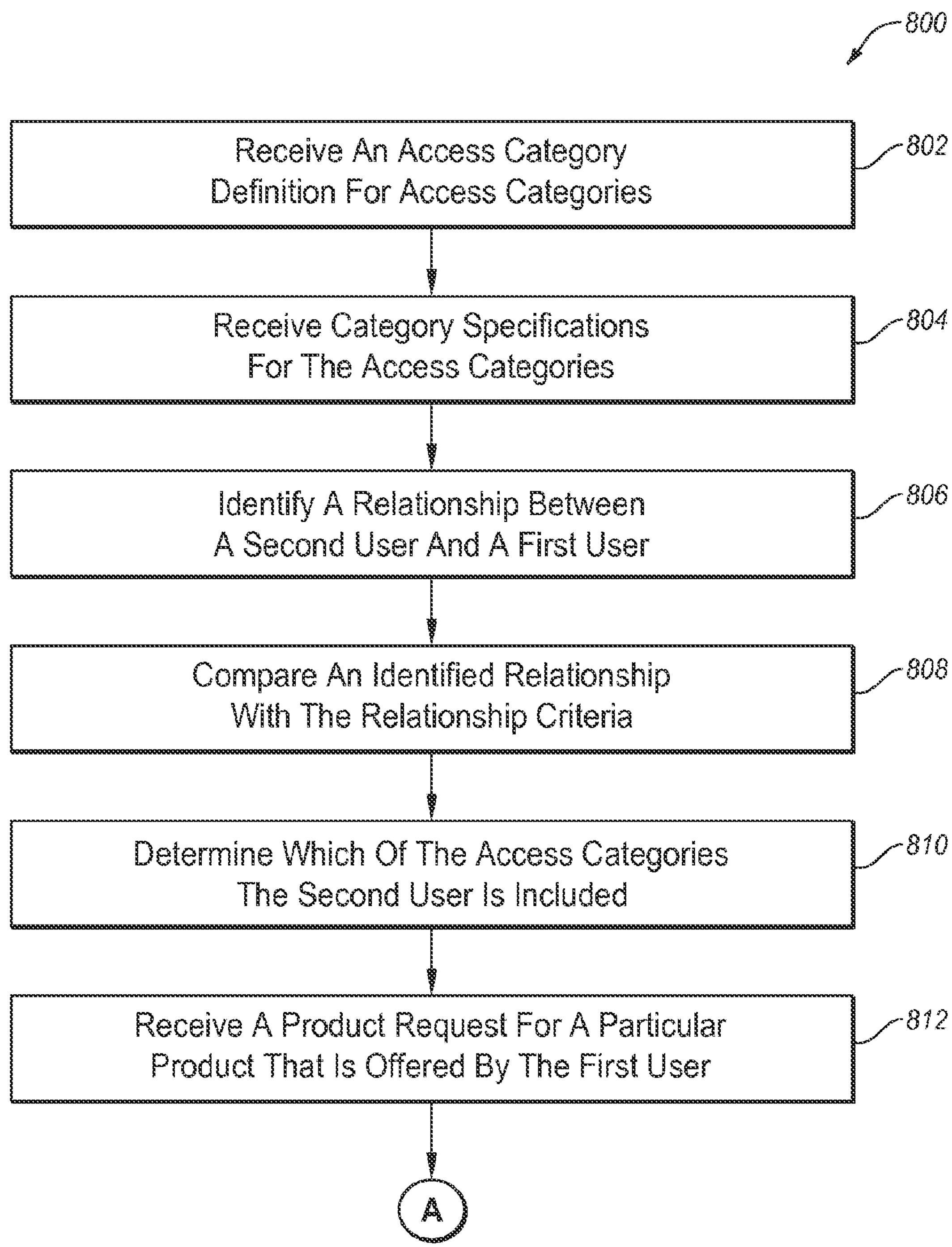
FIGS. 8A and 8B are a flowchart of an example method of social network-based inventory management.
Figure 8B:
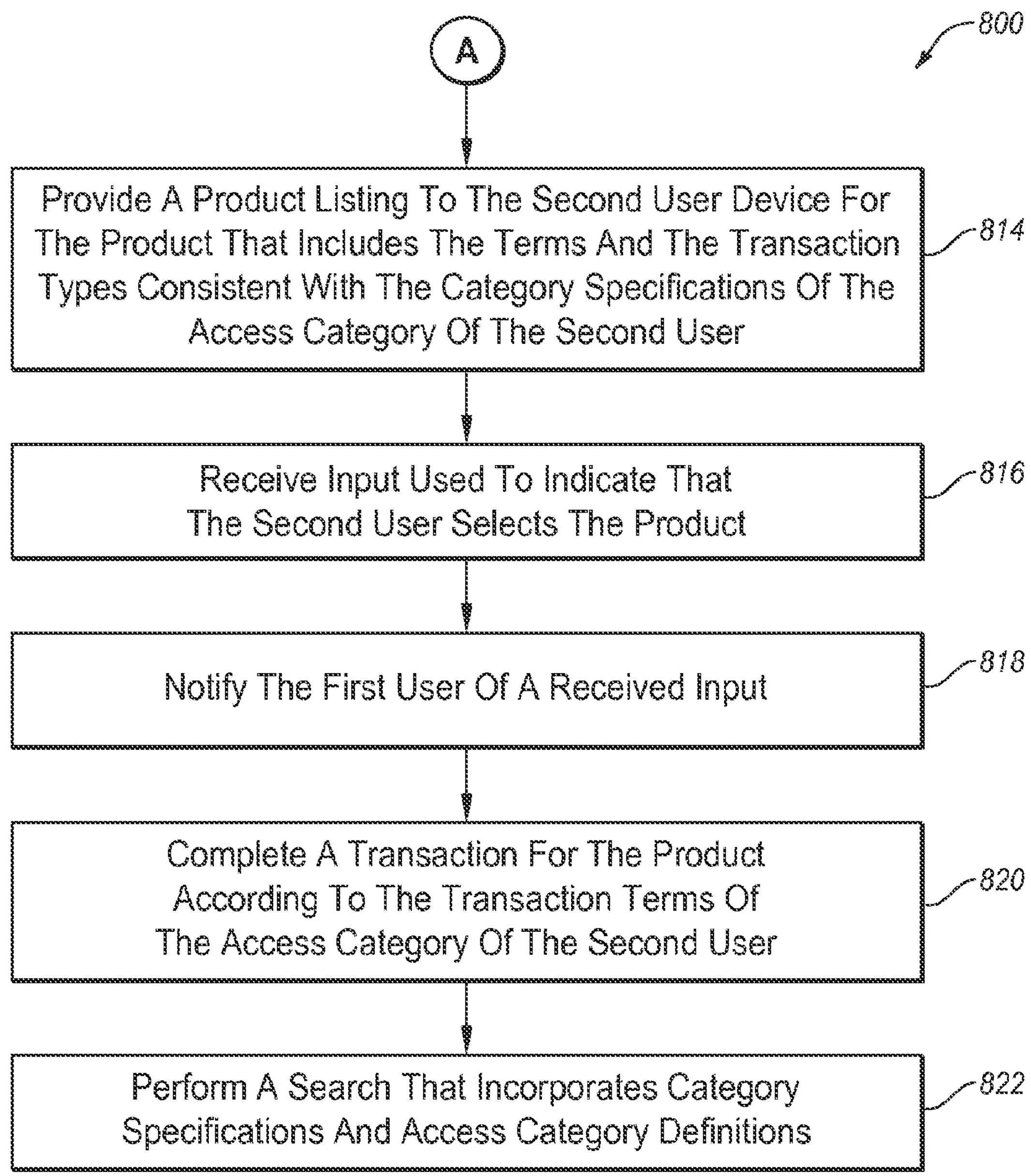

FIGS. 8A and 8B are a flowchart of an example method 800 of social network-based inventory management, arranged in accordance with at least one embodiment described herein. Although illustrated as discrete blocks, various blocks may be divided into additional blocks, combined into fewer blocks, or eliminated, depending on the desired implementation.

With reference to FIG. 8A, the method 800 may begin at block 802 in which an access category definition may be received for one or more access categories. The access category definition may include relationship criteria for the access categories. In some embodiments, the relationship criteria include a temporary location, a permanent location, a group membership, a number of connections in one or more social graphs of one or more social networks, other characteristics of users, or some combination thereof.

At block 804, category specifications may be received for the access categories. The category specifications may identify a product, a transaction term, a transaction type or some combination thereof that are available to users who meet the relationship criteria for the access categories. The transaction type may include a rent transaction, a buy transaction, a use transaction, a receive transaction, a share transaction, an auction transaction or some combination thereof. Additionally or alternatively, the category specifications may include a first set of category specifications related to the particular product and a second set of category specifications related to another product. The product may include personal property and real property.

In some embodiments, one of the transaction terms includes a discount applied to the market price. In these and other embodiments, the method 800 may include receiving a product description, accessing transaction records on an e-commerce server, and comparing at least a part of the product description with information in the transaction records to determine the market price for the product.

At block 806, a relationship between a second user and a first user may be identified. In some embodiments, the identifying the relationship may include accessing social graphs of one or more social networks. Additionally, identifying the relationships may include receiving some user-identifying information, which may include login information, a user name, and the like. The user-identifying information may be parsed and used to search social graphs for such information and/or request particular information related to users.

At block 808, an identified relationship may be compared with the relationship criteria. At block 810, it may be determined which of the access categories the second user is included. The determination may be based on a comparison between the identified relationship and the relationship criteria. At block 812, a product request may be received for a particular product that is offered by the first user. The product request may be received from a second user device that is associated with the second user.

With reference to FIG. 8B, at block 814 a product listing may be provided to the second user device for the product. The product listing may include the transaction terms and the transaction types consistent with the category specifications of the access category of the second user. For example, the product listing may be provided in response to a received product request. At block 816, input may be received that is used to indicate that the second user selects the product. For example, the second user may select on the product listing an icon that is used to indicate that the second user would like to enter into a transaction involving the product. At block 818, the first user may be notified of a received input. For example, a system server may communicate a notification to the first device that indicates that the second user wants to enter into a transaction involving the product. At block 820, at least a portion of a transaction may be completed for the product according to the category specifications of the access category of the second user. At block 822, a search may be performed that incorporates category specifications and access category definitions. For example a product search and/or a buyer search may be performed.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 9:
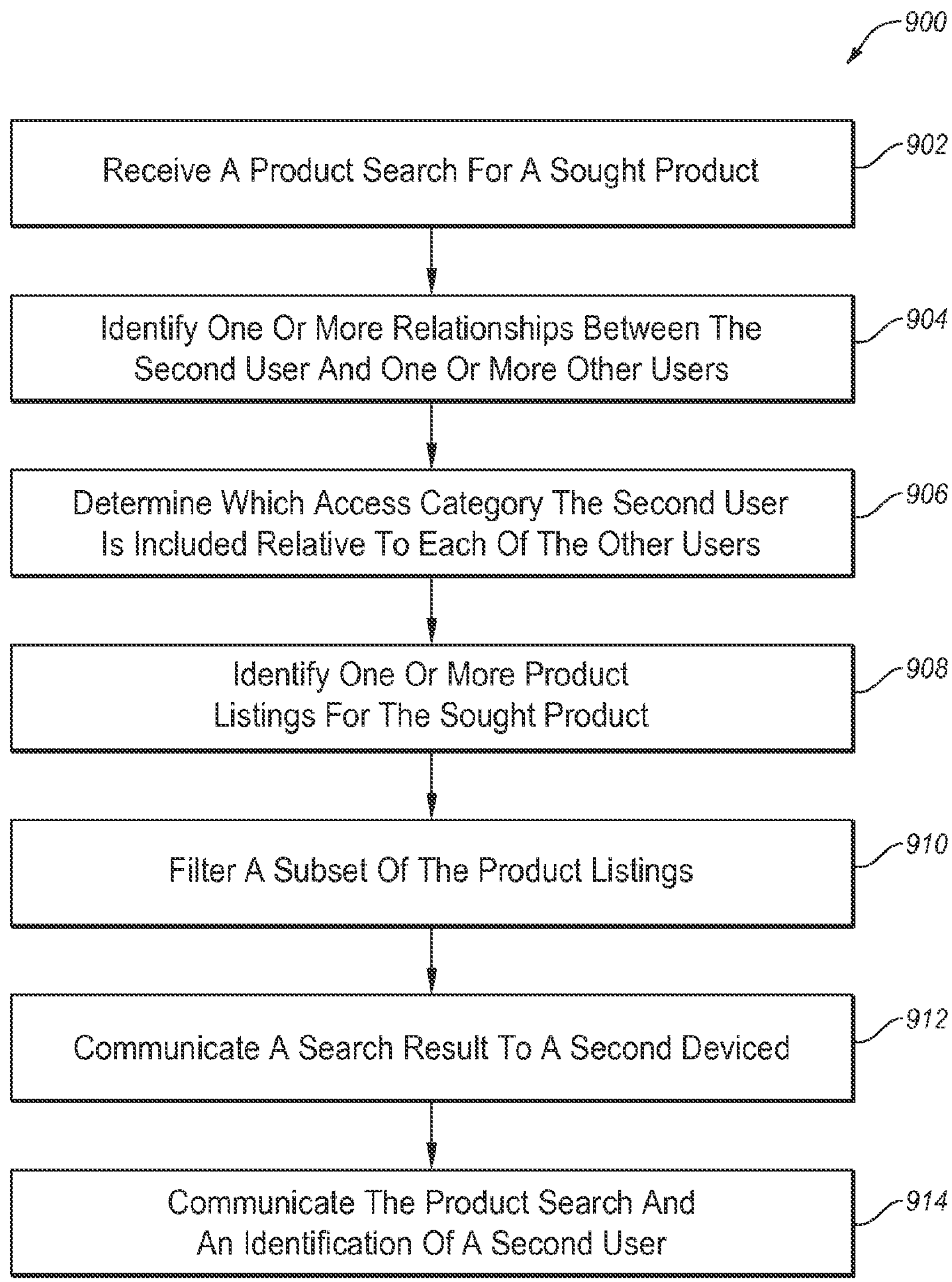
FIG. 9 is a flowchart of an example method of performing a product search.

FIG. 9 is a flowchart of an example method 900 of performing a product search, arranged in accordance with at least one embodiment described herein. Although illustrated as discrete blocks, various blocks may be divided into additional blocks, combined into fewer blocks, or eliminated, depending on the desired implementation.

The method 900 may begin at block 902 in which a product search may be received for a sought product. The product search may be received from a second user device. The product search may include one or more particular transaction types and/or one or more particular transaction terms.

At block 904, one or more relationships may be identified between the second user and one or more other users. In some embodiments, the relationships may be identified by a system server such as the system server 124 of FIG. 1. At block 906, it may be determined which access categories the second user is included relative to each of the other users. The determination may be based on a comparison between identified relationships and relationship criteria defined by the other users. In some embodiments, the determination may be made by the system server.

At block 908, product listings may be identified for the sought product. At block 910, a subset of the product listings may be filtered. For example, the subset in which the second user fails to meet relationship criteria for an access category in which the particular terms and/or the particular transaction types are available may be filtered. At block 912, a search result may be communicated to a second device. The search result may include product listings for the sought product that include the particular terms and the particular transaction types of the product search. At block 914, a product search and identification of a second user associated with the second user device may be communicated to one or more other user devices.

In some embodiments the method 900 may be implemented in another method discussed in the disclosure. For example, the method 900 may be implemented as block 822 of the method 800.

Figure 10:
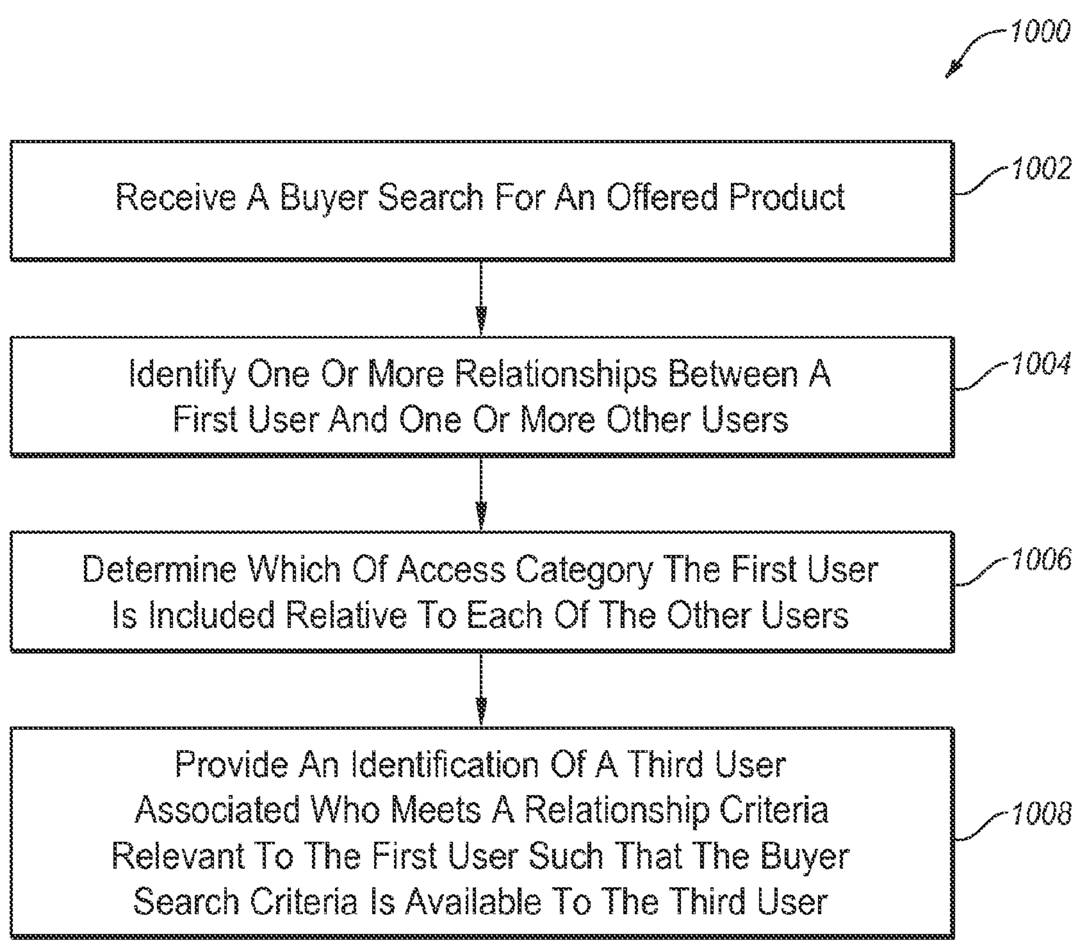
FIG. 10 is a flowchart of an example method of performing a buyer search.

FIG. 10 is a flowchart of an example method 1000 of performing a buyer search, arranged in accordance with at least one embodiment described herein. Although illustrated as discrete blocks, various blocks may be divided into additional blocks, combined into fewer blocks, or eliminated, depending on the desired implementation.

The method 1000 may begin at block 1002 in which a buyer search may be received. The buyer search may be received from a first user device associated with a first user. The buyer search may be for an offered product and may one or more buyer search criteria. The buyer search criteria may include particular transaction types, particular transaction terms, particular products, particular access categories, or some combination thereof.

At block 1004, one or more relationships may be identified between the first user and one or more other users. In some embodiments, the relationships may be identified by a system server. At block 1006, it may be determined which access categories the other users are included relative to the first user. The determination may be based on a comparison between identified relationships and relationship criteria defined by the first user. In some embodiments, the determination may be made by the system server.

At block 1008, an identification of a third user who meets relationship criteria relative to the first user such that the buyer search criteria are available to the third user may be provided to the first user device. In some embodiments, the provision of the identification of the third party may be in response to the buyer search.

In some embodiments the method 1000 may be implemented in another method discussed in the disclosure. For example, the method 1000 may be implemented as block 822 of the method 800.

Figure 11:
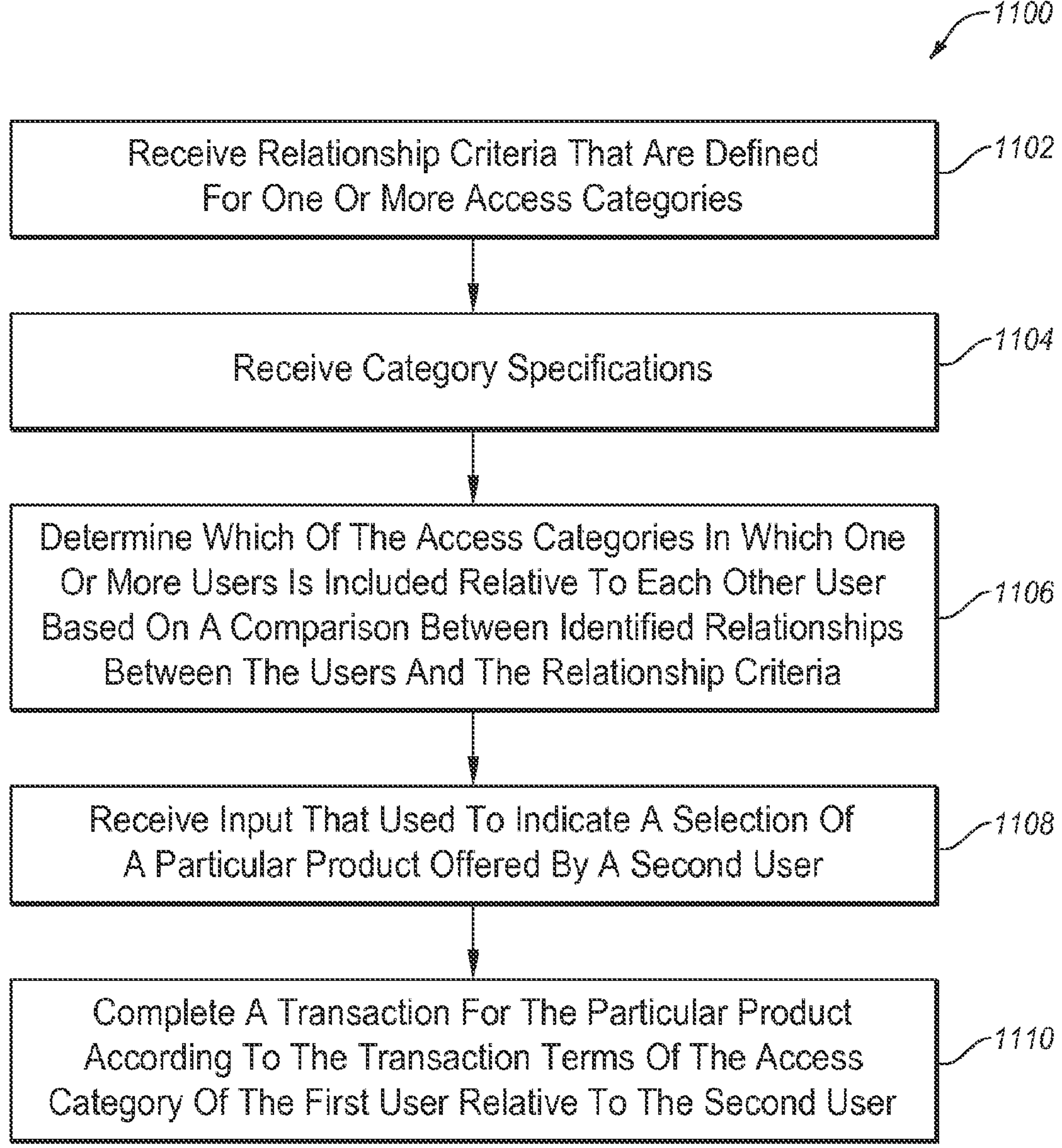
FIG. 11 is a flowchart of another example of social network-based inventory management, in accordance with at least one embodiment disclosed herein.

FIG. 11 is a flowchart of another example method 1100 of social network-based inventory management, arranged in accordance with at least one embodiment described herein. Although illustrated as discrete blocks, various blocks may be divided into additional blocks, combined into fewer blocks, or eliminated, depending on the desired implementation.

The method 1100 may begin at block 1102 in which relationship criteria may be received. The relationship criteria may be defined for one or more access categories. In some embodiments the relationship criteria may be received from one or more user devices. At block 1104, category specifications may be received. The category specifications may identify products, transaction terms, transaction types, or some combination thereof that are available to users who meet the relationship criteria for the access categories. In some embodiments, the category specifications may be received from the user devices.

At block 1106, it may be determined which of the access categories one or more users is included relative to each other user. The determination may be based on a comparison between identified relationships between the users and the relationship criteria. In some embodiments, the determination may include accessing social graphs of one or more third party social network servers. For example, a system server may access social graphs of the one or more third party social network servers. Additionally, the determination may include analyzing a relationship between the users based on one or more connections in one or more of the social graphs.

At block 1108, input may be received that is used to indicate a selection of a particular product offered by a second user. The input may be received from a first user device associated with a first user. At block 1110, a transaction for the particular product may be completed, at least partially, by the system server. The transaction may be completed according to category specifications of the access category of the first user relative to the second user.

In some embodiments, the method 1100 may include receiving, from a second user device associated with a third user, a product request for a second particular product offered by the first user. Additionally, in these and other embodiments, the method 1100 may include in response to the product, providing, by the system server, a product listing to a second user device for the second particular product that includes the transaction terms and the transaction types consistent with the category specifications of the access category of the third user relative to the first user.

Additionally or alternatively, in some embodiment, one of the category specifications may include a discount applied to a market price. In these and other embodiments, the method 1100 may include receiving, from a first user device associated with the first user, product descriptions for one or more products in an inventory of products offered by the first user. Transaction records may then be accessing on an e-commerce server. At least a part of the product description may be compared with information in the transaction records to determine a market price for the product, The methods 800, 900, 1000, and 1100 may be implemented, in some embodiments, by a computing device or computing system, such as the user device 110 or the system server 124 discussed herein or the computing device 700 discussed with reference to FIG. 7. In some embodiments, the user device 110, the system server 124, or the computing device 700 may include or may be communicatively coupled to a non-transitory computer-readable medium (e.g., the memory 706 of FIG. 7) having stored thereon programming code or instructions (e.g., the protection module 712 of FIG. 7) that are executable by a processor (such as the processor 704 of FIG. 7) to cause the user device 110, the system server 124, or the computing device 700 to perform the method 800, 900, 1000, and 1100. Additionally or alternatively, user device 110, the system server 124, or the computing device 700 may include the processor 704 described above that is configured to execute computer instructions to cause the user device 110, the system server 124, or the computing device 700 or another computing device to perform the method 800, 900, 1000, and 1100.

As indicated above, the embodiments described herein may include the use of a special purpose or general purpose computer (e.g., the processor 704 of FIG. 7) including various computer hardware or software modules, as discussed in greater detail below. Further, as indicated above, embodiments described herein may be implemented using computer-readable media (e.g., the memory 706 of FIG. 7) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:

receiving, by a system server from a first user device, electronic data comprising category specifications for a first access category and a second access category;

transmitting, by the system server via an API call to a social network that is hosted on a third party server, a request for data elements associated with connections between a first user, a second user, and a third user;

responsive to transmitting the request, receiving, from the third party server, the data elements associated with the connections between the first user, the second user, and the third user;

identifying, by the system server, the connections within the data elements received from the third party server, associated with the first user, the second user, and the third user within a social structure of the social network hosted by the third party server;

generating, by the system server, a digital mapping of the connections of the social network between the first user and the second user, and between the first user and the third user within the social network;

constructing, by the system server, a social graph based on the social structure of the social network that is hosted on the third party server;

based on the digital mapping and the social graph, identifying, by the system server, a first relationship between the second user and the first user;

based on the digital mapping and the social graph identifying, by the system server, a second relationship between the third user and the first user;

determining, by the system server, in which access categories the second user and the third user are included based on a comparison between the first relationship, the second relationship, and a relationship criteria;

receiving, by the system server from a second user device associated with the second user, a first category specification request for a particular category specification that is offered by the first user; and in response to the first category specification request and a determination that the second user meets the relationship criteria of the first access category:

generating, by the system server, a first category specification graphic comprising a first side portion, a second portion, and a third side portion, each of the category specifications of the first access category being arranged at the first side portion, the second portion, and the third side portion;

generating, by the system server, a second category specification graphic comprising a fourth side portion, fifth portion, and a sixth side portion, each of the category specifications of the second access category being arranged at the fourth side portion, the fifth portion, and the sixth side portion; and causing, via a communication network, display of the first category specification graphic on the second user device;

receiving, by the system server from a third user device that is associated with the third user, a second category specification request for the particular category specification based on a determination that the third user meets the relationship criteria of the second access category; and based on the second category specification request, the digital mapping, and the social graph:

causing, via the communication network, display of the second category specification graphic on the third user device, the second category specification graphic comprising a second category specification that includes transaction terms and transaction types arranged at the fourth side portion, the fifth portion, and the sixth side portion of the second category specification graphic consistent with the category specifications of the second access category of the third user relative to the first user.

2. The method of claim 1, further comprising receiving, from the first user device, an access category definition that includes the relationship criteria defined for the first access category and the second access category.

3. The method of claim 1, wherein the relationship criteria includes one or more or a combination of a temporary location, a permanent location, and a group membership.

4. The method of claim 1, further comprising:

receiving, from the first user device, a product description for a product;

accessing transaction records on an e-commerce server; and comparing at least a part of the product description with information in the transaction records to determine a market price for the product, wherein the transaction terms include a discount applied to the market price.

5. The method of claim 1, further comprising:

receiving, from the second user device, a product search for a product, wherein the product search includes one or both of a particular transaction type and a particular transaction term;

identifying, by the system server, one or more relationships between the second user and one or more other users; and determining, by the system server, which access categories the second user is included in relative to each of the one or more other users based on a comparison between identified relationships and relationship criteria defined by the one or more other users.

6. The method of claim 1, further comprising:

receiving from the first user device, a buyer search that includes one or more buyer search criteria including one or more or a combination of a particular transaction type, a particular term, and a product description; and in response to the buyer search, providing to the first user device, an identification of the third user who meets the relationship criteria relative to the first user such that the one or more buyer search criteria are available to the third user.

7. The method of claim 1, wherein:

the transaction types include a rent transaction, a buy transaction, a use transaction, a receive transaction, a share transaction, or an auction transaction; and the particular category specification includes personal property or real property.

8. The method of claim 1, further comprising:

receiving input used to indicate that the second user selects the particular category specification; and completing at least a portion of a transaction for the particular category specification according to the category specifications of the first access category.

9. The method of claim 4, further comprising:

comparing at least a part of a received product description with information in the transaction records to determine the market price for the product.

10. A system comprising:

one or more processors; and one or more non-transitory computer-readable storage media communicatively coupled to the one or more processors and storing instructions that, in response to execution by the one or more processors, cause a system to perform operations comprising:

receiving, by a system server from a first user device, electronic data comprising category specifications for a first access category and a second access category;

transmitting, by the system server via an API call to a social network that is hosted on a third party server, a request for data elements associated with connections between a first user, a second user, and a third user;

responsive to transmitting the request, receiving, from the third party server, the data elements associated with the connections between the first user, the second user, and the third user;

identifying, by the system server, the connections within the data elements received from the third party server, associated with the first user, the second user, and the third user within a social structure of the social network hosted by the third party server;

generating, by the system server, a digital mapping of the connections of the social network between the first user and the second user, and between the first user and the third user within the social network;

constructing, by the system server, a social graph based on the social structure of the social network that is hosted on the third party server;

based on the digital mapping and the social graph, identifying, by the system server, a first relationship between the second user and the first user;

based on the digital mapping and the social graph identifying, by the system server, a second relationship between the third user and the first user;

determining, by the system server, in which access categories the second user and the third user are included based on a comparison between the first relationship, the second relationship and a relationship criteria;

receiving, by the system server from a second user device associated with the second user, a first category specification request for a particular category specification that is offered by the first user; and in response to the first category specification request and a determination that the second user meets the relationship criteria of the first access category:

generating, by the system server, a first category specification graphic comprising a first side portion, a second portion, and a third side portion, each of the category specifications of the first access category being arranged at the first side portion, the second portion, and the third side portion;

causing the first category specification graphic to be displayed on a category specification user interface;

generating, by the system server, a second category specification graphic comprising a fourth side portion, fifth portion, and a sixth side portion, each of the category specifications of the second access category being arranged at the fourth side portion, the fifth portion, and the sixth side portion; and causing, via a communication network, display of the first category specification graphic on the second user device;

receiving, by the system server from a third user device that is associated with the third user, a second category specification request for the particular category specification based on a determination that the third user meets the relationship criteria of the second access category;

based on the second category specification request, the digital mapping, and the social graph:

causing, via the communication network, display of the second category specification graphic on the third user device the second category specification graphic comprising a second category specification that includes transaction terms and transaction types arranged at the fourth side portion, the fifth portion, and the sixth side portion of the second category specification graphic consistent with the category specifications of the second access category of the third user relative to the first user.

11. The system of claim 10, further comprising:

determining that the second user fails to meet the relationship criteria based on the digital mapping and the social graph for the first access category that the transaction types of a received product search are available.

12. The system of claim 10, wherein the category specifications identify particular product, transaction terms, and transaction types that are available to users who meet the relationship criteria for the first access category or the second access category.

13. The system of claim 10, wherein the category specifications include a first set of category specifications related to the particular category specification and a second set of category specifications related to another category specification.

14. The system of claim 10, wherein the category specifications include a discount applied to a market price.

15. The system of claim 10, wherein the category specifications include transaction types available to users that meet the relationship criteria of the first access category or the second access category.

16. A non-transitory computer readable storage medium comprising instructions that when executed by a computer processor configure hardware processing circuitry to perform operations comprising:

receiving, by a system server from a first user device, electronic data comprising category specifications for a first access category and a second access category;

transmitting, by the system server via an API call to a social network that is hosted on a third party server, a request for data elements associated with connections between a first user, a second user, and a third user;

responsive to transmitting the request, receiving, from the third party server, the data elements associated with the connections between the first user, the second user, and the third user;

identifying, by the system server, the connections within the data elements received from the third party server, associated with the first user, the second user, and the third user within a social structure of the social network hosted by the third party server;

generating, by the system server, a digital mapping of the connections of the social network between the first user and the second user, and between the first user and the third user within the social network;

constructing, by the system server, a social graph based on the social structure of the social network that is hosted on the third party server;

based on the digital mapping and the social graph, identifying, by the system server, a first relationship between the second user and the first user;

based on the digital mapping and the social graph identifying, by the system server, a second relationship between the third user and the first user;

determining, by the system server, in which access categories the second user and the third user are included based on a comparison between the first relationship, the second relationship, and a relationship criteria;

receiving, by the system server from a second user device associated with the second user, a first category specification request for a particular category specification that is offered by the first user; and in response to the first category specification request and a determination that the second user meets the relationship criteria of the first access category:

generating, by the system server, a first category specification graphic comprising a first side portion, a second portion, and a third side portion, each of the category specifications of the first access category being arranged at the first side portion, the second portion, and the third side portion;

generating, by the system server, a second category specification graphic comprising a fourth side portion, fifth portion, and a sixth side portion, each of the category specifications of the second access category being arranged at the fourth side portion, the fifth portion, and the sixth side portion; and causing, via a communication network, display of the first category specification graphic on the second user device;

receiving, by the system server from a third user device that is associated with the third user, a second category specification request for the particular category specification based on a determination that the third user meets the relationship criteria of the second access category; and based on the second category specification request, the digital mapping, and the social graph:

causing, via the communication network, display of the second category specification graphic on the third user device the second category specification graphic comprising a second category specification that includes transaction terms and transaction types arranged at the fourth side portion, the fifth portion, and the sixth side portion of the second category specification graphic consistent with the category specifications of the second access category of the third user relative to the first user.

17. The non-transitory computer readable storage medium of claim 16, wherein the operations further comprise:

receiving, from the first user device, product descriptions for one or more products offered by the first user.

18. The non-transitory computer readable storage medium of claim 17, wherein the operations further comprise:

comparing at least a part of the product descriptions with information in one or more transaction records to determine a market price for the particular category specification.

19. The non-transitory computer readable storage medium of claim 16, wherein the relationship criteria includes one or more or a combination of a temporary location, a permanent location, and a group membership.

20. The non-transitory computer readable storage medium of claim 16, wherein the category specifications comprises one or more or a combination of a product, a transaction term, or a transaction type that are available to users that meet relationship criteria based on the digital mapping for each of the first access category and the second access category.

* * * * *